United States Patent
Holzband et al.

(10) Patent No.: US 10,601,937 B2
(45) Date of Patent: Mar. 24, 2020

(54) RESPONSIVE ACTION PREDICTION BASED ON ELECTRONIC MESSAGES AMONG A SYSTEM OF NETWORKED COMPUTING DEVICES

(71) Applicant: Spredfast, Inc., Austin, TX (US)

(72) Inventors: Adam Philip Holzband, Austin, TX (US); Ben McKown, Austin, TX (US); William Weiss, Austin, TX (US); Mike Cohen, Austin, TX (US); Randall Hejtmanek, Austin, TX (US)

(73) Assignee: Spredfast, Inc., Austin, TX (US)

( * ) Notice: Subject to any disclaimer, the term of this patent is extended or adjusted under 35 U.S.C. 154(b) by 140 days.

(21) Appl. No.: 15/821,543

(22) Filed: Nov. 22, 2017

(65) Prior Publication Data

US 2019/0158610 A1 May 23, 2019

(51) Int. Cl.
*H04L 29/08* (2006.01)
*H04L 12/58* (2006.01)

(52) U.S. Cl.
CPC .............. *H04L 67/22* (2013.01); *H04L 51/16* (2013.01); *H04L 51/32* (2013.01); *H04L 51/02* (2013.01); *H04L 67/20* (2013.01); *H04L 67/306* (2013.01)

(58) Field of Classification Search
CPC ......... H04L 67/10; H04L 67/22; H04L 67/36; H04L 67/306; G06F 16/313;
(Continued)

(56) References Cited

U.S. PATENT DOCUMENTS 6,041,311 A 3/2000 Chislenko et al.
6,146,026 A 11/2000 Ushiku
(Continued)

FOREIGN PATENT DOCUMENTS

CN 102054033 A 5/2011
WO 2009047674 A2 4/2009
(Continued)

OTHER PUBLICATIONS

Ahmed, Saba, Final Office Action dated Jun. 29, 2016 for U.S. Appl. No. 14/098,492.
(Continued)

*Primary Examiner* — James N Fiorillo
(74) *Attorney, Agent, or Firm* — Kokka & Backus, PC

(57) ABSTRACT

Various embodiments relate generally to data science and data analysis, computer software and systems, and control systems to provide a platform to facilitate implementation of an interface, and, more specifically, to a computing and data storage platform that implements specialized logic to predict an action based on content in electronic messages, at least one action being a responsive electronic message. In some examples, a method may include receiving data representing an electronic message with an electronic messaging account, identifying one or more component characteristics associated with one or more components of the electronic message, characterizing the electronic message based on the one or more component characteristics to classify the electronic message for a response as a classified message, causing a computing device to perform an action to facilitate the response to the classified message, and the like.

16 Claims, 9 Drawing Sheets

(58) Field of Classification Search
CPC .. G06F 16/353; G06F 17/276; G06F 17/2705; G06F 17/2765
USPC .................................................. 709/204, 206
See application file for complete search history.

(56) References Cited

U.S. PATENT DOCUMENTS

| | | | |
|---|---|---|---|
| 6,385,611 B1 | 5/2002 | Cardona | |
| 6,684,239 B1 | 1/2004 | Flepp et al. | |
| 6,742,032 B1 | 5/2004 | Castellani et al. | |
| 6,871,232 B2 | 3/2005 | Curie et al. | |
| 7,032,030 B1 | 4/2006 | Codignotto | |
| 7,222,156 B2 | 5/2007 | Gupta et al. | |
| 7,409,710 B1 | 8/2008 | Uchil et al. | |
| 7,606,865 B2 | 10/2009 | Kumar et al. | |
| 7,644,057 B2* | 1/2010 | Nelken | G06F 17/2705 706/55 |
| 7,702,541 B2 | 4/2010 | Black et al. | |
| 7,725,492 B2 | 5/2010 | Sittig et al. | |
| 7,751,620 B1* | 7/2010 | Cosoi | H04L 51/12 382/168 |
| 7,756,926 B2 | 7/2010 | Tseng et al. | |
| 7,818,758 B2 | 10/2010 | Bonet et al. | |
| 7,979,369 B2 | 7/2011 | Grenier et al. | |
| 8,006,187 B1 | 8/2011 | Bailey et al. | |
| 8,027,931 B2 | 9/2011 | Kalaboukis | |
| 8,082,308 B1 | 12/2011 | Filev | |
| 8,131,745 B1 | 3/2012 | Hoffman et al. | |
| 8,171,128 B2 | 5/2012 | Zuckerberg et al. | |
| 8,200,527 B1 | 6/2012 | Thompson et al. | |
| 8,225,376 B2 | 7/2012 | Zuckerberg et al. | |
| 8,286,154 B2 | 10/2012 | Kaakani et al. | |
| 8,321,300 B1 | 11/2012 | Bockius et al. | |
| 8,412,657 B2 | 4/2013 | Grenier et al. | |
| 8,505,069 B1 | 8/2013 | Solodovnikov et al. | |
| 8,606,792 B1 | 12/2013 | Jackson et al. | |
| 8,615,442 B1 | 12/2013 | Kapur et al. | |
| 8,752,041 B2 | 6/2014 | Akiyoshi et al. | |
| 8,769,417 B1 | 7/2014 | Robinson et al. | |
| 8,825,515 B1 | 9/2014 | Hanson | |
| 8,886,580 B2 | 11/2014 | Grenier et al. | |
| 8,892,524 B1 | 11/2014 | Lee et al. | |
| 8,972,428 B2 | 3/2015 | Dicker et al. | |
| 9,021,361 B1 | 4/2015 | Pettinati et al. | |
| 9,105,044 B2 | 8/2015 | Wu | |
| 9,141,997 B2 | 9/2015 | Gaedcke et al. | |
| 9,143,478 B2 | 9/2015 | Ramaswamy | |
| 9,229,702 B1 | 1/2016 | Kapulkin et al. | |
| 9,311,683 B1 | 4/2016 | Saylor et al. | |
| 9,338,186 B2 | 5/2016 | Wollenstein et al. | |
| 9,378,295 B1* | 6/2016 | Marra | G06F 16/35 |
| 9,483,802 B2 | 11/2016 | Gaedcke et al. | |
| 9,501,746 B2* | 11/2016 | Prakash | H04L 63/1483 |
| 9,509,742 B2 | 11/2016 | Gordon | |
| 9,519,723 B2 | 12/2016 | Lorenz et al. | |
| 9,596,206 B2 | 3/2017 | Bueno et al. | |
| 9,619,531 B2 | 4/2017 | Wu | |
| 9,756,098 B2 | 9/2017 | Kazerani et al. | |
| 9,800,639 B2 | 10/2017 | Gordon | |
| 9,953,063 B2 | 4/2018 | Spasojevic et al. | |
| 10,084,838 B2 | 9/2018 | Gordon et al. | |
| 10,142,386 B2 | 11/2018 | Gordon | |
| 10,264,042 B2 | 4/2019 | Gordon | |
| 2001/0025253 A1 | 9/2001 | Heintz et al. | |
| 2001/0042087 A1* | 11/2001 | Kephart | G06F 16/353 715/229 |
| 2001/0047290 A1 | 11/2001 | Petras et al. | |
| 2002/0010746 A1 | 1/2002 | Jilk et al. | |
| 2002/0049793 A1 | 4/2002 | Okumura et al. | |
| 2002/0070953 A1 | 6/2002 | Barg et al. | |
| 2002/0105545 A1 | 8/2002 | Carter et al. | |
| 2003/0028525 A1 | 2/2003 | Santos et al. | |
| 2003/0078959 A1 | 4/2003 | Yeung et al. | |
| 2003/0128203 A1 | 7/2003 | Marshall et al. | |
| 2003/0135565 A1 | 7/2003 | Estrada | |
| 2003/0225850 A1 | 12/2003 | Teague | |
| 2004/0174397 A1 | 9/2004 | Cereghini et al. | |
| 2005/0060643 A1 | 3/2005 | Glass et al. | |
| 2005/0132348 A1 | 6/2005 | Meulemans et al. | |
| 2005/0206644 A1 | 9/2005 | Kincaid | |
| 2006/0010215 A1* | 1/2006 | Clegg | G06Q 10/107 709/206 |
| 2006/0036685 A1 | 2/2006 | Canning et al. | |
| 2006/0129602 A1 | 6/2006 | Witriol et al. | |
| 2006/0143307 A1 | 6/2006 | Codignotto | |
| 2006/0155581 A1 | 7/2006 | Eisenberger et al. | |
| 2006/0206578 A1 | 9/2006 | Heidloff et al. | |
| 2007/0083536 A1 | 4/2007 | Darnell et al. | |
| 2007/0136354 A1 | 6/2007 | Chen | |
| 2007/0171716 A1 | 7/2007 | Wright et al. | |
| 2007/0282800 A1 | 12/2007 | England et al. | |
| 2007/0286528 A1 | 12/2007 | Podilchuk | |
| 2008/0005284 A1 | 1/2008 | Ungar et al. | |
| 2008/0033776 A1 | 2/2008 | Marchese | |
| 2008/0034058 A1 | 2/2008 | Korman et al. | |
| 2008/0040673 A1 | 2/2008 | Zuckerberg et al. | |
| 2008/0103906 A1 | 5/2008 | Singh | |
| 2008/0109245 A1 | 5/2008 | Gupta | |
| 2008/0109491 A1 | 5/2008 | Gupta | |
| 2008/0120379 A1 | 5/2008 | Malik | |
| 2008/0126476 A1 | 5/2008 | Nicholas et al. | |
| 2008/0133488 A1 | 6/2008 | Bandaru et al. | |
| 2008/0178125 A1 | 7/2008 | Elsbree et al. | |
| 2008/0189406 A1 | 8/2008 | Shen | |
| 2008/0215591 A1 | 9/2008 | Howard et al. | |
| 2008/0221870 A1 | 9/2008 | Attardi et al. | |
| 2008/0263603 A1 | 10/2008 | Murray et al. | |
| 2008/0294680 A1 | 11/2008 | Powell et al. | |
| 2008/0306830 A1 | 12/2008 | Lasa et al. | |
| 2009/0013043 A1 | 1/2009 | Tan | |
| 2009/0043852 A1 | 2/2009 | Weir et al. | |
| 2009/0089657 A1 | 4/2009 | Davis | |
| 2009/0106080 A1 | 4/2009 | Carrier et al. | |
| 2009/0132311 A1 | 5/2009 | Klinger et al. | |
| 2009/0138472 A1 | 5/2009 | MacLean | |
| 2009/0144723 A1 | 6/2009 | Hartin et al. | |
| 2009/0157667 A1 | 6/2009 | Brougher et al. | |
| 2009/0157708 A1 | 6/2009 | Bandini et al. | |
| 2009/0157899 A1 | 6/2009 | Gagliardi et al. | |
| 2009/0158265 A1 | 6/2009 | Davis et al. | |
| 2009/0177670 A1 | 7/2009 | Grenier et al. | |
| 2009/0181649 A1 | 7/2009 | Bull et al. | |
| 2009/0210282 A1 | 8/2009 | Elenbaas et al. | |
| 2009/0249451 A1 | 10/2009 | Su et al. | |
| 2009/0292722 A1 | 11/2009 | Ayloo | |
| 2009/0300036 A1 | 12/2009 | Nagasaki | |
| 2010/0082503 A1 | 4/2010 | Kantak et al. | |
| 2010/0106730 A1 | 4/2010 | Aminian et al. | |
| 2010/0119053 A1 | 5/2010 | Goeldi | |
| 2010/0121707 A1 | 5/2010 | Goeldi | |
| 2010/0121843 A1 | 5/2010 | Goeldi | |
| 2010/0169148 A1 | 7/2010 | Oberhofer et al. | |
| 2010/0205663 A1 | 8/2010 | Ward et al. | |
| 2010/0223341 A1* | 9/2010 | Manolescu | H04L 51/32 709/206 |
| 2010/0246797 A1 | 9/2010 | Chavez et al. | |
| 2010/0250683 A1 | 9/2010 | Hoyne et al. | |
| 2010/0274732 A1 | 10/2010 | Grinchenko et al. | |
| 2010/0287512 A1 | 11/2010 | Gan et al. | |
| 2010/0306122 A1 | 12/2010 | Shaffer | |
| 2010/0312769 A1* | 12/2010 | Bailey | G06F 16/95 707/740 |
| 2011/0004922 A1 | 1/2011 | Bono et al. | |
| 2011/0055217 A1 | 3/2011 | Kamel et al. | |
| 2011/0055264 A1 | 3/2011 | Sundelin et al. | |
| 2011/0077988 A1 | 3/2011 | Cates et al. | |
| 2011/0113041 A1 | 5/2011 | Hawthorne et al. | |
| 2011/0119593 A1 | 5/2011 | Jacobson et al. | |
| 2011/0125826 A1 | 5/2011 | Erhart et al. | |
| 2011/0144801 A1 | 6/2011 | Selker et al. | |
| 2011/0153603 A1 | 6/2011 | Adiba et al. | |
| 2011/0197146 A1 | 8/2011 | Goto et al. | |
| 2011/0212430 A1 | 9/2011 | Smithmier et al. | |
| 2011/0219087 A1 | 9/2011 | Jorasch et al. | |

(56) References Cited

U.S. PATENT DOCUMENTS

| | | |
|---|---|---|
| 2011/0246513 A1 | 10/2011 | Covannon et al. |
| 2011/0289574 A1 | 11/2011 | Hull et al. |
| 2012/0036080 A1 | 2/2012 | Singer et al. |
| 2012/0054135 A1 | 3/2012 | Salaka et al. |
| 2012/0076367 A1 | 3/2012 | Tseng |
| 2012/0077158 A1 | 3/2012 | Jastrzembski et al. |
| 2012/0095861 A1 | 4/2012 | Feng et al. |
| 2012/0102021 A1 | 4/2012 | Hill et al. |
| 2012/0117059 A1 | 5/2012 | Bailey et al. |
| 2012/0158632 A1 | 6/2012 | Grenier et al. |
| 2012/0195422 A1 | 8/2012 | Famous |
| 2012/0208568 A1 | 8/2012 | Cooley |
| 2012/0232953 A1 | 9/2012 | Custer |
| 2012/0254321 A1 | 10/2012 | Lindsay et al. |
| 2012/0265806 A1 | 10/2012 | Blanchflower et al. |
| 2012/0271729 A1 | 10/2012 | Vincelette et al. |
| 2012/0284155 A1 | 11/2012 | Holten et al. |
| 2012/0290605 A1 | 11/2012 | Ickman et al. |
| 2012/0303659 A1 | 11/2012 | Erhart et al. |
| 2012/0317198 A1 | 12/2012 | Patton et al. |
| 2013/0007121 A1 | 1/2013 | Fontenot et al. |
| 2013/0018957 A1* | 1/2013 | Parnaby ............... G06Q 10/10 709/204 |
| 2013/0024522 A1 | 1/2013 | Pierre et al. |
| 2013/0050747 A1 | 2/2013 | Cok et al. |
| 2013/0066876 A1 | 3/2013 | Raskino et al. |
| 2013/0110946 A1 | 5/2013 | Bradshaw |
| 2013/0116044 A1 | 5/2013 | Schwartz |
| 2013/0138428 A1 | 5/2013 | Chandramouli et al. |
| 2013/0159472 A1 | 6/2013 | Newton et al. |
| 2013/0218801 A1 | 8/2013 | Rago |
| 2013/0218865 A1 | 8/2013 | Angulo et al. |
| 2013/0282417 A1 | 10/2013 | Gaedcke et al. |
| 2013/0282594 A1 | 10/2013 | Gaedcke et al. |
| 2013/0282603 A1 | 10/2013 | Gaedcke et al. |
| 2013/0282722 A1 | 10/2013 | Grenier et al. |
| 2013/0291058 A1 | 10/2013 | Wollenstein et al. |
| 2013/0298038 A1* | 11/2013 | Spivack ............... H04L 65/403 715/753 |
| 2013/0304726 A1 | 11/2013 | Sandulescu et al. |
| 2013/0304758 A1 | 11/2013 | Gruber et al. |
| 2013/0318156 A1 | 11/2013 | Friedman et al. |
| 2014/0006524 A1 | 1/2014 | Singh et al. |
| 2014/0032306 A1 | 1/2014 | Sukornyk et al. |
| 2014/0040377 A1 | 2/2014 | Friedman et al. |
| 2014/0047429 A1 | 2/2014 | Gaither et al. |
| 2014/0067520 A1 | 3/2014 | Campanile |
| 2014/0074844 A1 | 3/2014 | Subramanian et al. |
| 2014/0082072 A1 | 3/2014 | Kass et al. |
| 2014/0108675 A1 | 4/2014 | Wu |
| 2014/0164352 A1 | 6/2014 | Denninghoff |
| 2014/0173444 A1 | 6/2014 | Wu |
| 2014/0173501 A1 | 6/2014 | Wu |
| 2014/0173509 A1 | 6/2014 | Wu |
| 2014/0181087 A1 | 6/2014 | Wu |
| 2014/0181194 A1 | 6/2014 | Sullivan |
| 2014/0181728 A1 | 6/2014 | Wu |
| 2014/0184841 A1 | 7/2014 | Woo et al. |
| 2014/0200989 A1 | 7/2014 | Kassko et al. |
| 2014/0222834 A1 | 8/2014 | Parikh et al. |
| 2014/0244621 A1 | 8/2014 | Lindsay |
| 2014/0278785 A1 | 9/2014 | Gaedcke et al. |
| 2014/0280113 A1 | 9/2014 | Hohwald |
| 2014/0289034 A1 | 9/2014 | Wu |
| 2014/0298199 A1 | 10/2014 | Johnson, Jr. et al. |
| 2014/0304249 A1 | 10/2014 | Ayzenshtat et al. |
| 2014/0324902 A1 | 10/2014 | Morris et al. |
| 2014/0358911 A1 | 12/2014 | McCarthy et al. |
| 2015/0032492 A1 | 1/2015 | Ting et al. |
| 2015/0032751 A1 | 1/2015 | Ting et al. |
| 2015/0039705 A1* | 2/2015 | Kursun ............... H04L 51/22 709/206 |
| 2015/0100537 A1 | 4/2015 | Grieves et al. |
| 2015/0112918 A1 | 4/2015 | Zheng et al. |
| 2015/0120713 A1 | 4/2015 | Kim et al. |
| 2015/0127453 A1 | 5/2015 | Tew et al. |
| 2015/0134457 A1 | 5/2015 | Cheung et al. |
| 2015/0134579 A1 | 5/2015 | Zaman et al. |
| 2015/0170294 A1 | 6/2015 | Goyal et al. |
| 2015/0193504 A1 | 7/2015 | Naidu et al. |
| 2015/0295869 A1* | 10/2015 | Li ............... H04L 51/12 709/206 |
| 2015/0310018 A1 | 10/2015 | Fan et al. |
| 2015/0312200 A1 | 10/2015 | Brav et al. |
| 2015/0381552 A1* | 12/2015 | Vijay ............... H04L 51/32 709/206 |
| 2016/0057576 A1 | 2/2016 | Kessler et al. |
| 2016/0073166 A1 | 3/2016 | Hu et al. |
| 2016/0080445 A1 | 3/2016 | Kazerani et al. |
| 2016/0110688 A1 | 4/2016 | Knox et al. |
| 2016/0125157 A1 | 5/2016 | Wu |
| 2016/0132904 A1 | 5/2016 | Mondal et al. |
| 2016/0132973 A1 | 5/2016 | Wu |
| 2016/0134580 A1 | 5/2016 | Castera et al. |
| 2016/0147760 A1* | 5/2016 | N ............... G06F 16/3322 707/751 |
| 2016/0151704 A1 | 6/2016 | Wu |
| 2016/0203221 A1 | 7/2016 | Rao et al. |
| 2016/0203523 A1 | 7/2016 | Spasojevic et al. |
| 2016/0210555 A1* | 7/2016 | Murphy ............... G06N 5/04 |
| 2016/0320926 A1* | 11/2016 | Ganin ............... G06F 3/0482 |
| 2016/0321261 A1 | 11/2016 | Spasojevic et al. |
| 2016/0321562 A1* | 11/2016 | Zeng ............... G06Q 10/06 |
| 2016/0321694 A1 | 11/2016 | Vorozhtsov |
| 2016/0335572 A1* | 11/2016 | Bennett ............ G06Q 10/06311 |
| 2016/0352667 A1* | 12/2016 | Pickett ............... H04L 51/16 |
| 2017/0180294 A1* | 6/2017 | Milligan ............... H04L 51/16 |
| 2018/0053114 A1* | 2/2018 | Adjaoute ............... G06N 7/005 |
| 2018/0091468 A1 | 3/2018 | Yong et al. |
| 2018/0144389 A1* | 5/2018 | Fredrich ............ G06Q 30/0631 |
| 2018/0152471 A1* | 5/2018 | Jakobsson ............ G06Q 50/01 |
| 2018/0219830 A1* | 8/2018 | O'Brien ............... H04L 51/12 |
| 2018/0329565 A1* | 11/2018 | Yeung ............... G06F 3/017 |
| 2018/0367484 A1* | 12/2018 | Rodriguez ............ G06Q 10/101 |
| 2019/0114356 A1* | 4/2019 | Senftleber ............ G06F 17/2765 |
| 2019/0116137 A1 | 4/2019 | Senftleber et al. |
| 2019/0116148 A1 | 4/2019 | Senftleber et al. |
| 2019/0159166 A1* | 5/2019 | Aggarwal ............ H04W 68/02 |
| 2019/0228093 A1 | 7/2019 | Falcao et al. |
| 2019/0230151 A1 | 7/2019 | Falcao et al. |

FOREIGN PATENT DOCUMENTS

| | | |
|---|---|---|
| WO | 2013158839 A1 | 10/2013 |
| WO | 2014089460 A2 | 6/2014 |
| WO | 2014153463 A3 | 1/2015 |
| WO | 2015013436 A2 | 1/2015 |
| WO | 2019075284 A2 | 4/2019 |
| WO | 2019144159 A1 | 7/2019 |

OTHER PUBLICATIONS

Ahmed, Saba, Non-Final Office Action dated Nov. 19, 2015 for U.S. Appl. No. 14/098,492.

Arentz et al., Classifying offensive sites based on image content [online], Computer Vision and Image Understanding 94, 295-310, 2004, Retrieved from the Internet.

Blaufeld, Justin R., Final Office Action dated Mar. 24, 2016 for U.S. Appl. No. 14/098,501.

Blaufeld, Justin R., Non-Final Office Action dated Sep. 24, 2015 for U.S. Appl. No. 14/098,501.

Bostock, Mike, Sankey Diagram, available at http://bost.ocks.org/mike/sankey, published May 21, 2012, 1 pg.

Brown Jr., Nathan H., Final Office Action dated Mar. 29, 2011 for U.S. Appl. No. 11/971,856.

Brown Jr., Nathan H., Non-Final Office Action dated Jun. 6, 2012 for U.S. Appl. No. 13/167,482.

Brown Jr., Nathan H., Non-Final Office Action dated Mar. 24, 2014 for U.S. Appl. No. 13/780,487.

Brown JR., Nathan H., Non-Final Office Action dated Nov. 26, 2010 for U.S. Appl. No. 11/971,856.

(56) References Cited

OTHER PUBLICATIONS

Bui, Hanh Thi Minh, Non-Final Office Action dated Mar. 13, 2015 for U.S. Appl. No. 14/012,978.
Chung, Mong-Shune, Non-Final Office Action dated Jan. 29, 2016 for U.S. Appl. No. 14/098,505.
Filipczyk, Marcin R., Final Office Action dated Oct. 5, 2015 for U.S. Appl. No. 13/950,268.
Filipczyk, Marcin R., Non-Final Office Action dated Mar. 10, 2016 for U.S. Appl. No. 13/950,268.
Filipczyk, Marcin R., Non-Final Office action dated May 22, 2015 for U.S. Appl. No. 13/950,268.
Friedman et al., U.S. Appl. No. 61/650,849, filed May 23, 2012 and entitled, "Dynamic Information Streams in a Social Network Platform."
Gaedckle et al., U.S. Appl. No. 61/636,132, filed Apr. 20, 2012 and entitled, "System and Method for Providing a Social Customer Care System."
Georgandellis, Andrew C., Final Office Action dated Mar. 30, 2016 for U.S. Appl. No. 13/900,878.
Georgandellis, Andrew C., Final Office Action dated Oct. 26, 2017 for U.S. Appl. No. 13/900,878.
Georgandellis, Andrew C., Final Office Action dated Sep. 21, 2016 for U.S. Appl. No. 14/035,166.
Georgandellis, Andrew C., Non-Final Office Action dated Jan. 26, 2017 for U.S. Appl. No. 13/900,878.
Georgandellis, Andrew C., Non-Final Office Action dated Jul. 11, 2016 for U.S. Appl. No. 14/035,166.
Georgandellis, Andrew C., Non-Final Office Action dated May 23, 2017 for U.S. Appl. No. 14/035,166.
Georgandellis, Andrew C., Non-Final Office Action dated Nov. 3, 2015 for U.S. Appl. No. 13/900,878.
Goldberg, Ivan R., Final Office Action dated Jan. 12, 2015 for U.S. Appl. No. 13/835,502.
Goldberg, Ivan R., Final Office Action dated Jan. 13, 2015 for U.S. Appl. No. 13/835,250.
Goldberg, Ivan R., Final Office Action dated Jan. 15, 2015 for U.S. Appl. No. 13/865,429.
Goldberg, Ivan R., Non-Final Office Action dated Apr. 13, 2016 for U.S. Appl. No. 13/865,429.
Goldberg, Ivan R., Non-Final Office Action dated Jun. 18, 2014 for U.S. Appl. No. 13/835,250.
Goldberg, Ivan R., Non-Final Office Action dated Jun. 18, 2014 for U.S. Appl. No. 13/835,502.
Goldberg, Ivan R., Non-Final Office Action dated Jun. 20, 2014 for U.S. Appl. No. 13/865,411.
Goldberg, Ivan R., Non-Final Office Action dated Jun. 23, 2014 for U.S. Appl. No. 13/865,429.
Hatcher, Deirdre D., Non-Final Office Action dated Jan. 14, 2016 for U.S. Appl. No. 13/950,258.
Jang, Gijeong, Written Opinion of the International Searching Authority and International Search Report dated Jul. 28, 2015 for International Patent Application No. PCT/US2014/047866.
Kolosowski-Gager, Katherine, Non-Final Office Action dated Jun. 29, 2018 for U.S. Appl. No. 14/627,151.
Lithium Website, http://www.lithium.com, Dec. 11, 2010, retrieved from Internet Archive, pp. 1-9.
M2 PressWire, "Alterian: Social media monitoring and analytics comes of age with Alterian's acquisition of market leader Techrigy," Jul. 15, 2009, Anonymous, Norman Media Ltd, London.
Mosley, Kyle T., Non-Final Office Action dated Dec. 28, 2017 for U.S. Appl. No. 14/852,965.
Mosley, Kyle T., Non-Final Office Action dated Oct. 4, 2017 for U.S. Appl. No. 14/627,151.
Netzloff, Eric R., Non-Final Office Action dated Nov. 25, 2014 for U.S. Appl. No. 13/848,706.
Oh, Eung Gie, Written Opinion of the International Searching Authority and International Search Report dated Nov. 18, 2014 for International Patent Application No. PCT/US2014/031345.
Olshannikov, Alex, Final Office Action dated Apr. 15, 2016 for U.S. Appl. No. 14/098,480.
Olshannikov, Alex, Final Office Action dated Feb. 17, 2016 for U.S. Appl. No. 14/098,509.
Olshannikov, Alex, Non-Final Office Action dated Nov. 5, 2015 for U.S. Appl. No. 14/098,480.
Olshannikov, Alex, Non-Final Office Action dated Oct. 22, 2015 for U.S. Appl. No. 14/098,509.
Raju, "5 Ways to Tweet More Than 140 Characters," Dec. 28, 2008, Technically Personal, http://www.techpp.com/2008/12/28/5-ways-to-tweet-more-than-140-characters/, retrieved from Internet Archive version from Mar. 3, 2011.
Rao et al., U.S. Appl. No. 62/049,642, filed Sep. 12, 2014 and entitled, "System and Apparatus for an Application Agnostic User Search Engine."
Spasojevic et al., U.S. Appl. No. 61/943,047, filed Feb. 21, 2014 and entitled, "Domain Generic Large Scale Topic Expertise & Interest Mining Across Multiple Online Social Networks."
Tabor, Amare F., Final Office Action dated Apr. 8, 2015 for U.S. Appl. No. 13/871,076.
Tabor, Amare F., Non-Final Office Action dated Aug. 15, 2014 for U.S. Appl. No. 13/871,076.
Thomas, Shane, Written Opinion of the International Searching Authority and International Search Report dated Aug. 16, 2013 for International Patent Application No. PCT/US2013/037107.
Walsh, John B., Non-Final Office Action dated Mar. 24, 2017 for U.S. Appl. No. 14/702,696.
Wollenstein et al., U.S. Appl. No. 61/639,509, filed Apr. 27, 2012 and entitled, "Systems and Methods for Implementing Custom Privacy Settings."
Wu, Michael, U.S. Appl. No. 61/734,927, filed Dec. 7, 2012 and entitled, "Systems and Methods for Presenting Analytic Data."
Wu, Michael, U.S. Appl. No. 62/072,929, filed Oct. 30, 2014 and entitled, "Systems and Methods to Monitor Health of Online Social Communities."
Young, Lee W., Written Opinion of the International Searching Authority and International Search Report dated May 28, 2014 for International Patent Application No. PCT/US2013/073625.
"Craigslist Online Community." Craigslist.org. Jul. 6, 2010.
Cannell, Larry, "Windows 7 Federated Search and SharePoint 2010" online article dated Jun. 2010 <http://blogs.gartner.com/larry-cannell/2010/09/09/windows-7-federated-search-and-sharepoint-2010/[May 13, 2016 12:36:15 PM].
Constine, Josh, "Facebook tests notification unsubscribe button for feed posts," Aug. 9, 2010. http://www.adweek.com/socialtime/unsubscribe-button-posts/244868.
Dwyer, Cameron, "Five out-of-the-box ways to get Email into SharePoint" Jan. 2012, <https://camerondwyer.wordpress.com/2012/09/04/five-out-of-the-box-ways-to-get-email-into-sharepoint/[May 13, 2016 10:48:43 AM].
Emojipedia, (https://web.archive.org/web/20150915110235/https://emojipedia.org/fisted-hand-sign/), Date: Sep. 15, 2015; (https://web.archive.org/web/20150823012626/https://emojipedia.org/clapping-hands-sign/), Date: Aug. 23, 2015; (https://web.archive.org/web/20150829090848/https://emojipedia.org/smiling-face-with-sunglasses/), Date: Aug. 29, 2015.
Falcao et al., U.S. Appl. No. 15/877,379, filed January 22, 2018 and entitled, "Temporal Optimization of Data Operations Using Distributed Search and Server Management."
Falcao et al., U.S. Appl. No. 15/877,381, filed Jan. 22, 2018 and entitled, "Temporal Optimization of Data Operations Using Distributed Search and Server Management."
Giphy, (https://web.archive.org/web/20140813065113/http://giphy.com/search/happy), Date: Aug. 13, 2014; https://web.archive.org/web20141231135329/https://giphy.com/upload, Date: Dec. 31, 2014; https://web.archive.org/web/20150919214012/http://giphy.com/create/upload, Date: Sep. 19, 2015.
Hashemi, Mazdak, "The Infrastructure Behind Twitter: Scale", Jan. 19, 2017, Twitter, Inc. Blog Post, https://blog.twitter.com/engineering/en_us/topics/infrastructure/2017/the-infrastructure-behind-twitter-scale.html.
Jou et al., "Predicting Viewer Perceived Emotions in Animated GIFs", Nov. 3-7, 2014 (4 pages).

(56) References Cited

OTHER PUBLICATIONS

Senftleber et al., U.S. Appl. No. 15/782,635, filed Oct. 12, 2017 and entitled, "Computerized Tools to Enhance Speed and Propagation of Content in Electronic Messages Among a System of Networked Computing Devices."
Senftleber et al., U.S. Appl. No. 15/782,642, filed Oct. 12, 2017 and entitled, "Predicting Performance of Content and Electronic Messages Among a System of Networked Computing Devices."
Senftleber et al., U.S. Appl. No. 15/782,653, filed Oct. 12, 2017 and entitled, "Optimizing Effectiveness of Content in Electronic Messages Among a System of Networked Computing Device."
Rashid, Ishrat, Non-Final Office Action dated Jun. 11, 2019 for U.S. Appl. No. 15/782,653.
Young, Lee W.; Notification of Transmittal of the International Search Report and the Written Opinion of the International Searching Authority, or the Declaration dated Jun. 24, 2019 for International Application No. PCT/US2019/014637.
Bista, Sanat Kumar et al., "Using Gamification in an Online Community," CSIRO ITC Centre, Conference Paper, 2012.
Frunzi, Victoria E., Non-Final Office Action dated Oct. 16, 2018 for U.S. Appl. No. 15/018,787.
Kolosowski-Gager, Katherine, Final Office Action dated Feb. 11, 2019 for U.S. Appl. No. 14/627,151.
Lithium Technologies. "Community Health Index for Online Communities." 2009, https://www.lithium.com/pdfs/whitepapers/Lithium-Community-Health-Index_v1AY2ULb.pdf. Retrieved from the Internet Wayback Machine, dated Feb. 19, 2011.
Netzloff, Eric R., Non-Final Office Action dated Nov. 6, 2018 for U.S. Appl. No. 14/824,021.
Ofori-Awuah, Maame, Non-Final Office Action dated Apr. 5, 2019 for U.S. Appl. No. 14/929,209.
Senftleber et al., International (PCT) Patent Application No. PCT/US2018/055545, filed Oct. 12, 2018 and entitled, "Predicting Performance of Content and Electronic Messages Among a System of Networked Computing Devices."
Senftleber et al., U.S. Appl. No. 16/158,167, filed Oct. 11, 2018 and entitled, "Credential and Authentication Management in Scalable Data Networks."
Senftleber et al., U.S. Appl. No. 16/158,169, filed Oct. 11, 2018 and entitled, "Native Activity Tracking Using Credential and Authentication Management in Scalable Data Networks."
Senftleber et al., U.S. Appl. No. 16/158,172, filed Oct. 11, 2018 and entitled, "Proxied Multi-Factor Authentication Using Credential and Authentication Management in Scalable Data Networks."
Senftleber et al., U.S. Appl. No. 16/194,126, filed Nov. 16, 2018 and entitled, "Multiplexed Data Exchange Portal Interface in Scalable Data Networks."
Vo, Huyen X., Non-Final Office Action dated Mar. 15, 2019 for U.S. Appl. No. 15/782,642.
Young, Lee W., Notification of Transmittal of the International Search Report and the Written Opinion of the International Searching Authority, or the Declaration, dated Apr. 1, 2019 for International Application No. PCT/US2018/05545.
Matthews, Tara, et al. "Community Insights: Helping Community Leaders Enhance the Value of Enterprise Online Communities." Proceedings of the SIGCHI Conference on Human Factors in Computing Systems, Apr. 27-May 2, 2013, Paris, France. ACM (2013). pp. 513-522.
Mesa, Joel, Non-Final Office Action for U.S. Appl. No. 15/782,635 dated Oct. 4, 2019.
Ofori-Awuah, Maame, Final Office Action dated Sep. 6, 2019 for U.S. Appl. No. 14/929,209.
Rashid, Ishrat, Final Office Action for U.S. Appl. No. 15/782,653 dated Sep. 19, 2019.
Wang, Xiaoqing, and Shannon Lantzy. "A Systematic Examination of Member Turnover and Online Community Health." Thirty Second International Conference on Information Systems, Shanghai (2011), pp. 1-11.

* cited by examiner

RESPONSIVE ACTION PREDICTION BASED ON ELECTRONIC MESSAGES AMONG A SYSTEM OF NETWORKED COMPUTING DEVICES

FIELD

Various embodiments relate generally to data science and data analysis, computer software and systems, and control systems to provide a platform to facilitate implementation of an interface, and, more specifically, to a computing and data storage platform that implements specialized logic to predict an action based on content in electronic messages, at least one action being a responsive electronic message.

BACKGROUND

Advances in computing hardware and software have fueled exponential growth in delivery of vast amounts of information due to increased improvements in computational and networking technologies. Also, advances in conventional data storage technologies provide an ability to store increasing amounts of generated data. Thus, improvements in computing hardware, software, network services, and storage have bolstered growth of Internet-based messaging applications, such as social networking platforms and applications, especially in an area of generating and sending information concerning products and services. Unfortunately, such technological improvements have contributed to a deluge of information that is so voluminous that any particular message may be drowned out in the sea of information. Consequently, providers of goods and services are typically inundated with messages concerning customer service-related matters via social networking platforms. Brand reputations and brand loyalty may be jeopardized if providers of goods and services are impeded from filtering through a multitude of messages to identify a relatively small number of critical messages.

In accordance with some conventional techniques, creators of content and information, such as manufacturers and merchants of products or services, have employed various techniques to review numerous messages to identify content that might be of critical nature. However, while functional, these techniques suffer a number of other drawbacks.

The above-described advancements in computing hardware and software have given rise to a relatively large number of communication channels through which information may be transmitted to the masses. For example, information may be transmitted via a great number of messages through text messages, website posts, social networking messages, and the like. However, social networking platforms are not well-suited to leverage social media to address customer service-related issues as social media platforms were initially formed to principally connect persons socially rather than commercially. For example, various conventional approaches to reviewing numerous social-related messages typically are resource intensive, requiring human reviewers to read a message and determine some type of dispositive action, which typically may be less repeatable and subject to various levels of skill and subjectivity applied to identifying messages that may be important to discover. Further, it is not unusual for the traditional approaches to consume relatively large quantities of computational resources and time, among other things.

Thus, what is needed is a solution for facilitating techniques to predict an action based on electronic messages, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
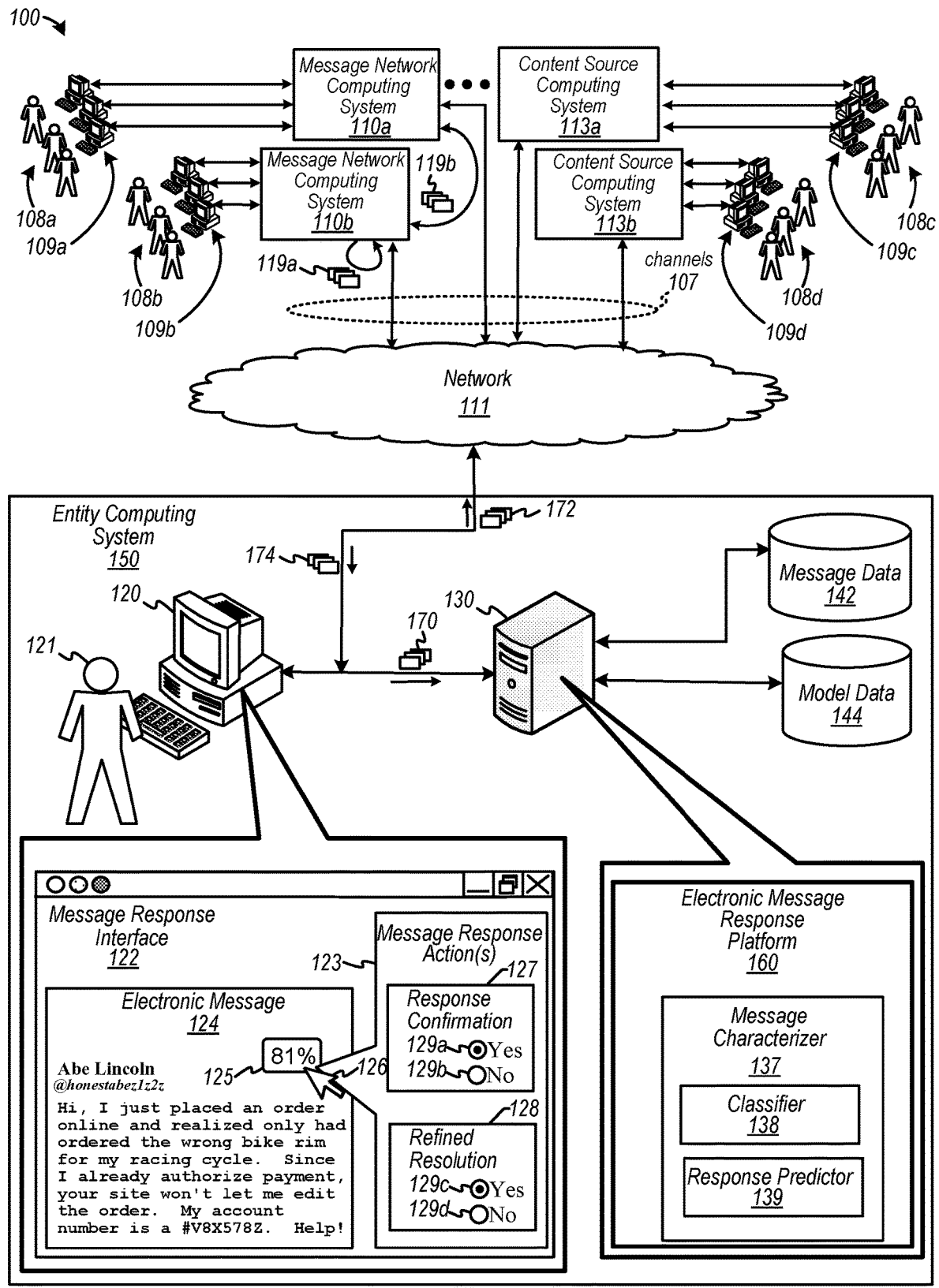
FIG. 1 is a diagram depicting an electronic message response platform, according to some embodiments.

FIG. 1 is a diagram depicting an electronic message response platform, according to some embodiments. Diagram 100 depicts an example of an entity computing system 150 configured to, among other things, predict whether an electronic message 174 received by an electronic message response platform 160 performs, or is likely to cause performance of, an action responsive to the contents of electronic message 174, according to various embodiments. In at least one implementation, electronic message response platform 160 may be configured to determine predictively whether to generate a response (e.g., a response electronic message) using a model formed, for example, based on historic behavior and/or activity. Examples of historic behavior and/or activity include past user inputs to, for example, generate a response relative to a previously received electronic message. Electronic message response platform 160 may be configured to predict responses for electronic messages 119a (e.g., intra-system messages), as well as for electronic messages 119b (e.g., inter-system messages) or any other message. Thus, electronic messages 119a and 119b need not be directed to electronic message response platform 160, which may capture the content from these messages to predict a response.

Further, electronic message response platform 160 may be configured to determine a value indicative of a likelihood of specific message contents to generate a response or perform other actions. For example, a received message may be further processed by applying or linking tags (e.g., metadata) to electronic message 174 and/or to any constituent components to identify such components. A component of a message may include, according to various examples, symbols (e.g., a letter or number), a word, a group of words, such as a phrase, a message topic, or any other characteristic of the electronic message associated with, or descriptive of, the message (as well as the message itself). Hence, electronic message response platform 160 may be configured to automatically route a received message to a subset of computing devices for refined resolution. As an example, a subset of computing devices may be associated with one or more agents who perform common tasks, such as reviewing a message in a specific language (e.g., electronic messages using Mandarin).

Diagram 100 depicts an entity computing system 150 including a user interface 120 and a computing device 130 (e.g., one or more servers, including one or more processors and/or memory devices), both of which may be configured to generate "response" messages that may be configured for users 108a, 108b, 108c, and 108d. Any one or more of message network computing systems 110a and 110b may be configured to receive and transmit electronic messages, regardless of a context, to convey an experience, observation, request for assistance (e.g., in relation to a product or service), or any other information with or among any number of users for any reason. One or more of message network computing systems 110a and 110b may be configured to distribute electronic message content in any form in any digital media or channel 107. In various examples, message network computing systems 110a and 110b may include any number of computing systems configured to propagate electronic messaging, including, but not limited to, computing systems including third party servers, such as third parties like Facebook™, Twitter™, LinkedIn™, Instagram™, Snapchat™, as well as other private or public social networks to provide social-media related informational data exchange services. Computing systems 113a and 113b may be configured to provide any type of digital content, such as email, text messaging (e.g., via SMS messages), web pages, audio, video (e.g., YouTube™), etc.

According to some examples, message network computing systems 110a and 110b may include applications or executable instructions configured to principally facilitate interactions (e.g., social interactions) amongst one or more persons, one or more subpopulations (e.g., private groups or public groups), or the public at-large. Examples of message network computing systems 110a and 110b, as channels 107, may include the above-mentioned electronic accounts for Facebook™, Twitter™, LinkedIn™, Instagram™, and Snapchat™, as well as YouTube™, Pinterest™, Tumblr™, WhatsApp™ messaging, or any other platform configured to promote sharing of content, such as videos, audio, or images, as well as sharing ideas, thoughts, etc. in a socially-based environment. According to some examples, content source computing systems 113a and 113b may include applications or executable instructions configured to principally promote an activity, such as a sports television network, a profession sports team (e.g., a National Basketball Association, or NBA®, team), a news or media organization, a product producing or selling organization, and the like. Content source computing systems 113a and 113b may implement websites, email, chatbots, or any other digital communication channels, and may further implement electronic accounts to convey information via message network computing systems 110a and 110b.

In view of the structures and/or functionalities of message network computing systems 110a and 110b and content source computing systems 113a and 113b, an electronic message may include a "tweet" (e.g., a message via a Twitter™ computing system), a "post" (e.g., a message via a Facebook™ computing system), or any other type of social network-based messages, along with any related functionalities, such as forwarding a message (e.g., "retweeting" via Twitter™), sharing a message, associating an endorsement of another message (e.g., "liking" a message, such as a Tweet™, or sharing a Facebook™ post, etc.), and any other interaction that may convey a "response" to one or more electronic accounts at increased rates of transmissions or propagation to address concerns or statements that may otherwise affect a reputation of a brand. According to various examples, an electronic message received via a network 111 can include any type of digital messaging that can be transmitted over any digital network.

According to some embodiments, entity computing system 150 or electronic message response platform 160, or both, may be configured to facilitate generation of an electronic message (e.g., a response electronic) based on predicting a likelihood of generating a response, or, alternatively, a dismissal of received message 174. In some examples, electronic message response platform 160 may be configured to characterize an electronic message and/or its contents (e.g., components) to identify a classification value that may be associated with the electronic message. For example, an electronic message 174 to entity computing system 150 may include content directed to a "racing bike retailer" (e.g., an electronic account identifier, such as @Kaneolli_Bikes), and the content may specify that a "wrong order number" has been used for an on-line purchase in association with a specific "customer account identifier." Electronic message response platform 160 may be configured to analyze the electronic message to characterize components "racing bike retailer," "wrong order number," and "customer account identifier." The characterized component values can be used to identify a "classification value" relative to, for example, a dataset includes data having similar characterized component values. According to some examples, a "classification" value may be a value specifying whether a response to the electronic message may be generated or dismissed. In a specific example, a classification value may be representative of a likelihood or probability of generating a response.

Entity computing system 150 is shown to include a computing device 120 and display configured to generate a user interface, such as a message response interface 122. Entity computing system 150 also includes a server computing device 130, which may include hardware and software, or a combination thereof, configured to implement an electronic message response platform 160 (or "response platform 160"), according to various examples. Response platform 160 may include a message characterizer 137 configured to characterize one or more received electronic messages (e.g., messages 119a, 119b, and 174 received via a network 111), as well as components, to identify a value indicative of a predicative response. Message characterizer 137 is shown to include a classifier 138 and a response predictor 139. Classifier 138 may be configured to classify a received electronic message as generating an action. Classifier 138 may be configured to classify a message as generating a response based on a threshold value (or range of values). In some examples, a threshold value may be formed empirically or theoretically based on historic actions of responses or dismissals as actions performed in relation to previously-received messages. Response predictor 139 may be configured to invoke an action, such as sending a response, dismissing the received electronic message, modifying a threshold value (e.g., setting a "risk tolerance threshold"), routing the received electronic message to a subset of computing devices (e.g., computing devices optimized to address messages in a certain language or for specific products) for refined processing or resolution, and the like. Also, electronic message response platform 160 may therefore be configured to generate and send response electronic messages to any of platforms 110a, 110b, 113a, and 113b.

To illustrate a functionality of response platform 160, consider an example in which a user 121, as an agent, may receive an electronic message 124 for presentation via message response interface 122, whereby electronic message 124 may originate at one or more computing systems 110a, 110b, 113a, and 113b. According to various examples, response platform 160 may be configured to determine a classification value for electronic message 124 to determine whether a response may be predicted. In this example, response platform 160 may determine electronic message 124 has a classification value of 0.81, as shown as visual identifier ("81%") 125, which exceeds an example threshold value of 0.80 (not shown). In some cases, if electronic message 124 is associated with a lesser value, such as 0.70, then response platform 160 may be configured to deemphasize, deprioritized, and/or dismiss presentation of electronic message 124 as well as any other action related thereto. Thus, computational resources and other resources may be preserved for handling numerous incoming electronic messages by predicting an amount of messages (e.g., a configurable amount) that may generate a response (e.g., relative to electronic messages that may be dismissed).

According to some embodiments, user 121 may interact with computing device 120 to generate a response electronic message 172. Response platform 160 may automatically generate a field into which user 121 may enter input to form a response electronic message (not shown). Also, response platform 160 may include logic configured to analyze and evaluate electronic message 124, prior to generating a message, to determine, for example, whether electronic message 124 may be automatically routed or forwarded to other one or more computing devices 120 associated users 121. For example, certain other computing devices 120 (not shown) may be designated or optimized to facilitate response message generation based on an attribute of electronic message 124. An attribute may indicate a particular language, such as German, a particular product, such as a "racing bike model 2XQ," demographic profile data about a sender of a message (e.g., originator's geographic location), and the like. Hence, resolution of a response may include automatically routing electronic message 124 to a computing device 120 based on an attribute.

In some implementations, user 121 may initiate or facilitate functionalities regarding the processing of a response message. Optionally, a user 121 may cause a selection device 126 to hover over or select graphical representation 125. In response, one or more message performance actions 123 may be presented to user 121. Here, response actions graphic representation 123 include a response confirmation in user interface portion 127 and a refined resolution selection portion 128. User 121 may cause selection device 126 to select user input ("yes") 129a to initiate generation of a response message. In some examples, user 121 may cause selection of user input ("no") 129b to "dismiss" generation of a response message. Further, user 121 may cause selection device 126 to select user input ("yes") 129c for initiating refined resolution of electronic message 174. In some examples, refined resolution may include routing to another computing device 120 for further refinements, such as generating a response electronic message based on language, product type, geographic location, or any other component characteristic or attribute.

Diagram 100 further depicts response platform 160 being coupled to memory or any type of data storage, such as data repositories 142 and 144, among others. Message data repository 142 may be configured to store any number of electronic messages 172 and 174 received (e.g., previously-received), generated, and transmitted by response platform 160. For example, response platform 160 may be configured to store multiple received electronic messages 174 (e.g., as historic archival data). Also, response platform 160 may be configured to determine characteristics or attributes of one or more components of received electronic messages. According to some examples, a component of an electronic message may include a word, a phrase, a topic, or any message attribute, which can describe the component. For example, a message attribute may include metadata that describes, for example, a language associated with the word, or any other descriptor, such as a synonym, a language, a user characteristic (e.g., age, gender identity, etc.), a reading level, a geographic location, and the like. Message attributes may also include values of one or more classification values (e.g., one or more values may predict an action, such as generating a response, etc.). Components of messages may be tagged or otherwise associated with any of the above-described metadata.

Continuing with the example of diagram 100, classification values may be derived based on model data, including an account's historical behavior or activity relative to a set of characterized attribute data. The model data may be stored in repository 144, along with classification values, threshold values, and the like.

Figure 2:
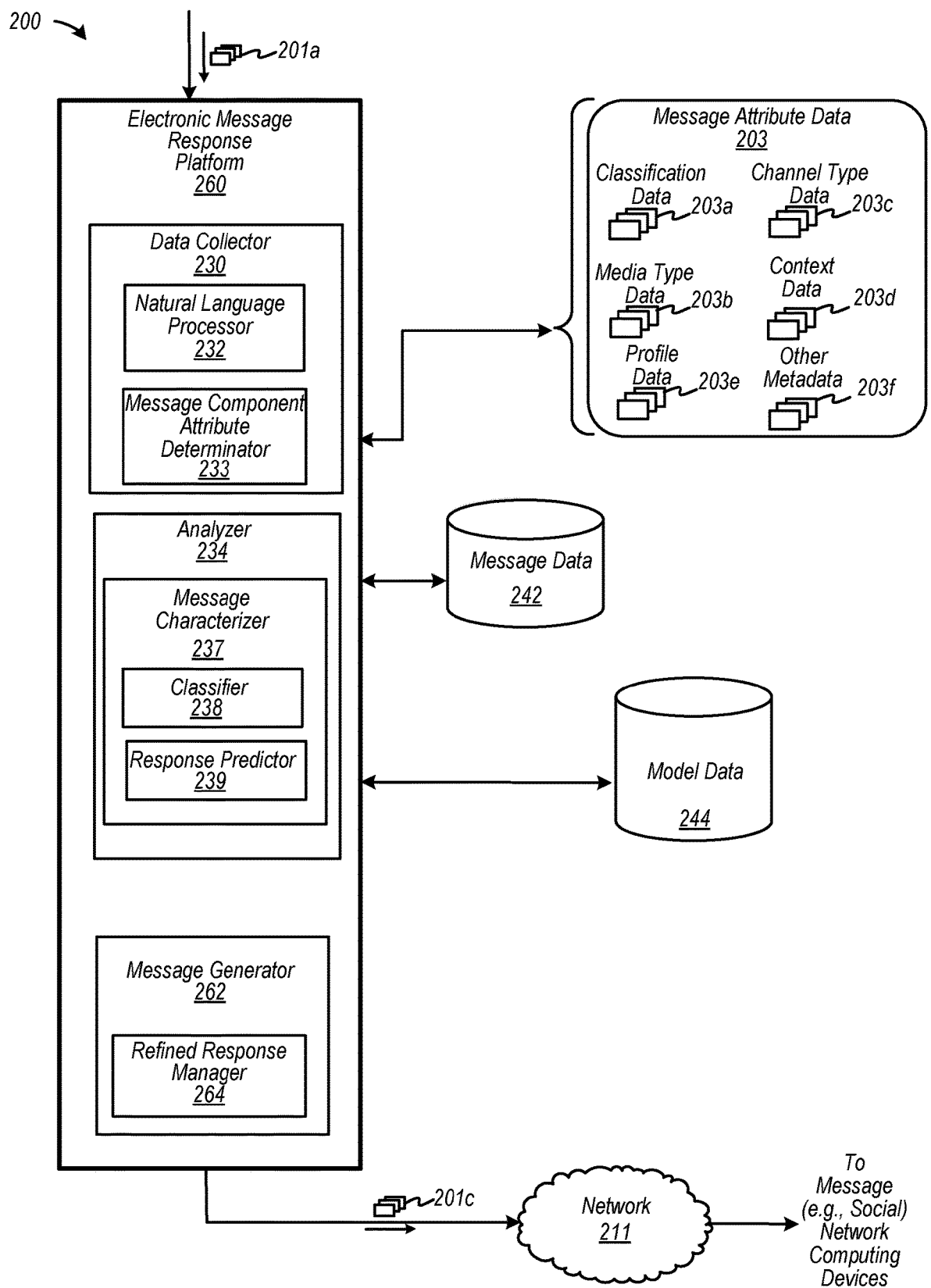
FIG. 2 depicts another example of an electronic message response platform, according to various examples.

FIG. 2 depicts another example of an electronic message response platform, according to various examples. Diagram 200 depicts a response platform 260 including a data collector 230, which, in turn, includes a natural language processor 232, an analyzer 234, and a message generator 262. Response platform 260 may be configured to receive data 201a, which may include electronic message data from a particular user account or from any number of other electronic accounts (e.g., social media accounts, email accounts, etc.). Further, response platform 260 may be configured to publish or transmit an electronic message 201c via network 211 to any number of message networked computing devices (not shown). In one or more implementations, elements depicted in diagram 200 of FIG. 2 may include structures and/or functions as similarly-named or similarly-numbered elements depicted in other drawings.

Data collector 230 is configured to detect and parse the various components of an electronic message, and further is configured to analyze the characteristics or attributes of each component. Data collector 230 is shown to include a natural language processor 232 and a message component attribute determinator 233. Natural language processor 232 may be configured to ingest data to parse portions of an electronic message (e.g., using word stemming, etc.) for identifying components, such as a word or a phrase. Also, natural language processor 232 may be configured to derive or characterize a message as being directed to a particular topic based on, for example, sentiment analysis techniques, content-based classification techniques, and the like. In some examples, natural language processor 232 may be configured to apply word embedding techniques in which components of an electronic message may be represented as a vector.

Message component attribute determinator 233 may be configured to identify characteristics or attributes, such as message attribute data 203, for a word, phrase, topic, etc. In various examples, message attribute data 203 may be appended, linked, tagged, or otherwise associated with a component to enrich data in, for example, message data repository 242 and/or model data repository 244. A classification value may be a characteristic or an attribute of a message component, and thus may be used as a tag. Examples of message attribute data 203 are depicted as classification data 203a (e.g., an attribute specifying whether a component or message may be classified as generating, for example, a response or dismissal), media type data 203b (e.g., an attribute specifying whether a component may be classified as being associated with an email, a post, a webpage, a text message, etc.), channel type data 203c (e.g., an attribute specifying whether a component may be associated with a type of social networking system, such as Twitter), and the like. Message attribute data 203 may also include context metadata 203d, which may include attributes that specify environmental data or contextual data, such as a context in which an electronic message is received or a response is generated. Thus, context metadata 203d may include data representing a time of day, a year, a season, a service-related context, a payment-related context, etc. Also, a tag including metadata 203d may refer to a context in which a word is used in a transmission of a number of electronic messages (e.g., a tag indicating a marketing campaign, or the like). Also, a tag including metadata 203d may refer to an industry or activity (e.g., a tag indicating an electronic message component relating to autonomous vehicle technology, or basketball), etc. Furthermore, message attribute data 203 may also include profile data 203e, which may include attributes that describe, for example, demographic data regarding an author of a received electronic message, or the like. Other metadata 203f may be associated with, or tagged to, a word or other message component. As such, other metadata 203f may include a tag representing a language in which the word is used (e.g., a tag indicating English, German, Mandarin, etc.). In some cases, other metadata 203d may include data representing values of computed threshold values or classification values (e.g., a tag may indicate a value of an amount of likelihood of generating a response, etc.). Message attribute data 203, and the corresponding tags, may be stored in message data repository 242.

Analyzer 234 may be configured to characterize various components to discover characteristics or attributes related to a component, and may further be configured to characterize a message as having an associated classification value (e.g., probability). Analyzer 234 includes a message characterizer 237, which, in turn, may include a classifier 238 and a response predictor 239. Classifier 238 may be configured to classify a received electronic message as being configured to generate an action, such as generating a response, based on a classification value relative to a threshold value (or range of values). A classification value, at least in some examples, may be derived by matching a pattern of data for a received electronic message against a data model stored in repository 244. For example, a data model may include patterns of vector data specifying characteristic or attribute values related to a corresponding classification value. In some examples, a threshold value may be formed empirically or theoretically based on historic actions of responses or dismissals and integrated into a data model. Response predictor 239 may be configured to invoke an action, such as sending a response, dismissing the received electronic message, modifying a threshold value, routing the received electronic message to a subset of computing devices for processing or resolution, and the like.

Diagram 200 further depicts response platform 260 including a message generator 262 configured to generate response messages. According to some examples, message generator 262 may include a refined response manager 264 that may be configured to automatically or manually cause further processing and refinement of a response message. A computing device configured to perform specific tasks relating to a characteristic of a message (e.g., messages relating to finances, including billing, invoicing, refunding, etc.) may be designated as a destination to which a subset of electronic messages may be directed. Thus, reduced instances of specialized software applications or a reduced set of skilled users may efficiently generate a response message. Message generator 262 may be configured further to generate any number of platform-specific response messages. Thus, message generator 262 may generate an electronic message or content formatted as, for example, a "tweet," a Facebook™ post, a web page update, an email, etc.

Figure 3:
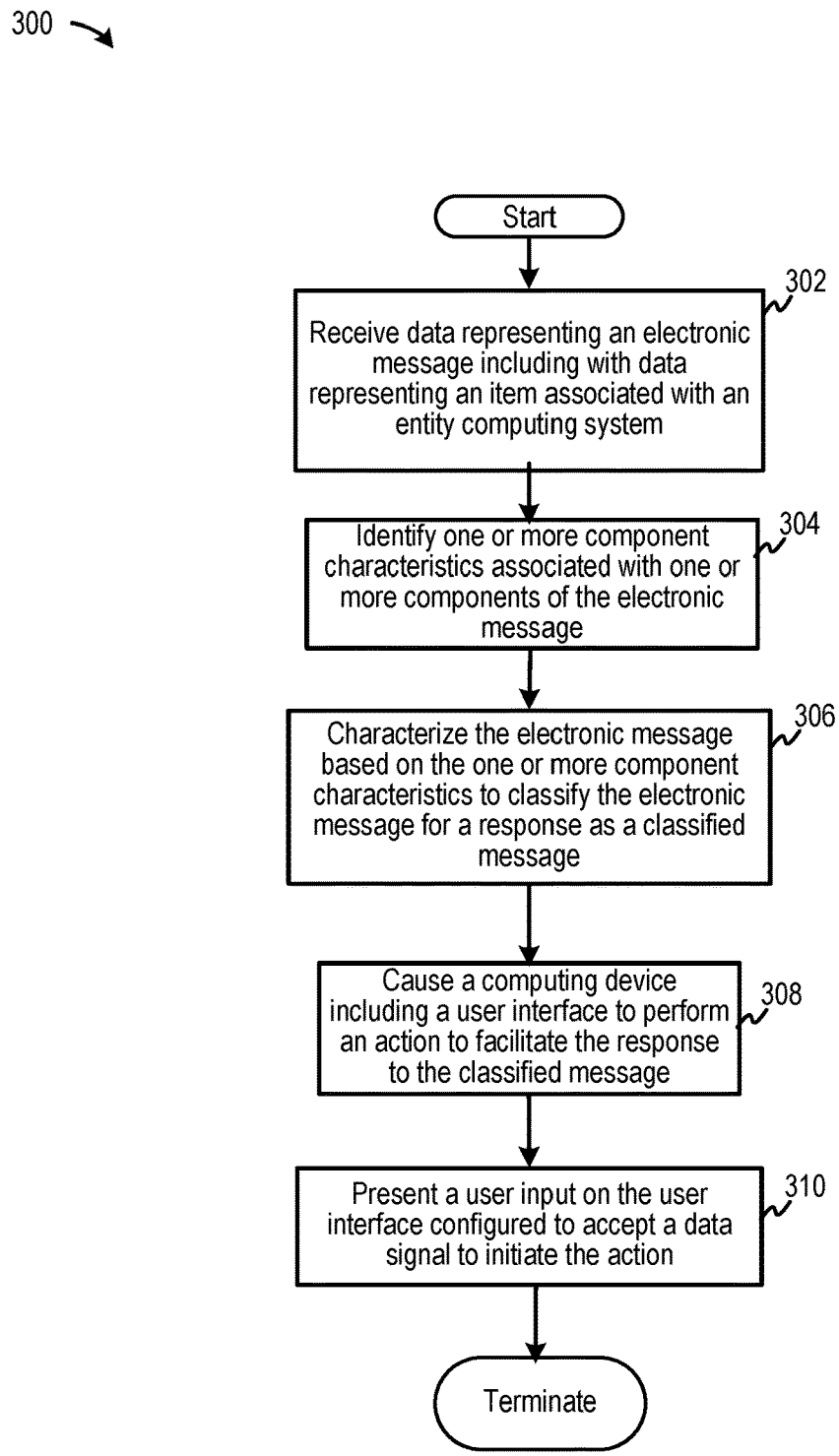
FIG. 3 is a flow diagram as an example of predicting at least one action for generating a response electronic message, according to some embodiments.

FIG. 3 is a flow diagram as an example of predicting at least one action for generating a response electronic message, according to some embodiments. Flow 300 may be an example of predictively determining whether to generate a response (e.g., a response electronic message) using a model formed, for example, based on historic behavior and/or activity (e.g., past control signals, user inputs, etc. in relation to prior messages-handling actions). At 302, data representing an electronic message may be received by an entity computing system (or electronic messaging account), the electronic message including data representing an item (e.g., content, topic, etc. of electronic message). Examples of entity computing systems including any subset of computing devices and memory storage devices implemented to manage, for example, a flow of electronic messages that may affect perception (e.g. brand management) or usage (e.g., customer service) of a product or service provided by an organization or individual as an entity (e.g., a manufacturer, a seller, etc.). Examples of electronic messaging accounts include data structures implemented in association with social networking platforms, such as accounts implemented for Facebook™, Twitter™, LinkedIn™, Instagram™, and Snapchat™, as well as other message or information-exchange applications or other platforms. Note that an electronic message may be transmitted to an electronic messaging account associated with either an entity computing system or a third party computing system. In the latter case, an entity computing system may "harvest" or "scrape" accessible social media-related messages not directed to the entity to identify whether to respond to a third party message associated with a third-party electronic account.

At 304, one or more component characteristics (e.g., electronic message attributes) associated with one or more components of an electronic message may be identified. Examples of component characteristics include, but are not limited to, data representing one or more of a language, a word, and a topic specifying a product or a service, a quality issue, a payment issue, or any other attribute specifying a characteristic of the content of an electronic message. Further, an electronic message may be characterized to identify a component characteristic value, which may be appended to data representing a component (e.g., appended as a tag, link, etc.). Hence, a tag specifying a component characteristic value may be used to determine whether to perform an action as a function of the component characteristic value. In one example, an action includes routing the electronic message to an agent computing system to generate a response. To illustrate, consider the following example in which electronic message is characterized to be written in the "French" language, which may be abbreviated as "FR." A tag "FR" may be applied to one or more components of an electronic message (as well as the message itself). An entity computing system, upon identifying the tag "FR," may be configured to route the message to a subset of agent computing devices at which French language-based items may be processed.

At 306, an electronic message may be characterized based on one or more component characteristics to classify whether an electronic message is classified as a message that likely initiates a response. For example, data representing component characteristics may be matched against a subset of patterns of data in a data model (e.g., using pattern matching techniques), the subset of patterns being associated with a likelihood that a specific pattern of data (of a received message) may likely cause a response. Thus, an electronic message may be classified as being associated with, for example, a first classification value that specifies generation of a responsive electronic message. In various examples, the content of a response message may include an automatically-generated acknowledgment of message receipt, an artificial intelligence ("AI")-generated response, or a human agent-generated response.

A first classification value may be determined (e.g., computed) for classifying an electronic message, whereby the first classification value represents a likelihood (e.g., a probability) of an action. An example of an action includes a generated electronic message responsive to at least one of the components, such as topics including "a price," "a product refund," "store hours of operation," "a malfunctioning product," etc. To classify an electronic message, a first threshold value may be retrieved, for example, from data storage. For example, a threshold value may include a value of "0.80," which may specify that an electronic message is classified as probabilistically generating a response if the first classification value meets or exceeds "0.80." So to determine whether a first classification applies to a received electronic message, a value, such as "0.89" associated with an electronic message, may be compared against a first threshold value of "0.80." Thus, if a value meets the threshold value, the electronic message may be classified such that the value is identified as a first classification value. Note that an electronic message may be associated with more than one classification, according to some examples.

At 306, a second threshold value may be identified against which to compare with a value to classify the electronic message, according to some examples. In one instance, a second threshold value may be described as a "risk tolerance threshold" value. In some cases, a second threshold value may be derived by varying a first threshold value to, for example, adjust the strictness or tolerance with which determinations to generate response messages are performed (e.g., varying a threshold value of "0.80" to "0.75"). By increasing a tolerance, a subset of classifications for another value associated with a response may be identified. For example, a relaxed second threshold value may facilitate detection of "false negatives" (e.g., messages that initially do not meeting a first threshold value). Accordingly, an electronic message (or portion thereof) may be classified as having a second classification value based on a second threshold value. In response, an evaluation may be performed to identify whether an electronic message has been classified initially as a false negative (e.g., a determination that incorrectly identifies an electronic message as predictively "not" generating a response relative to a first classification value, when at least in some cases the electronic message ought to generate a response). By determining that an electronic message should generate a response, the electronic message may be reclassified to form a reclassified electronic message. The reclassification of the message (e.g., based on an input to generate a response) may cause a data model to recalibrate so at to characterize other electronic messages (e.g., similar messages in the future) to increase accuracy of predicting the first classification value.

At 306, a third threshold value may be identified against which to compare with a value to classify the electronic message, according to some examples. The value can be compared against a third threshold value to classify an electronic message as, for example, "dismissed." Upon detecting the third classification value, the electronic message may predictably yield a dismissal. In some cases, dismissal of a message may be an action (or inaction). To illustrate, consider an electronic message is computed to be associated with first value of "0.35," whereby a "dismiss" threshold value may be "0.45." Hence, the electronic message may be dismissed in which, for example, no response is generated (or a response is suppressed or otherwise rejected). According to various examples, the third threshold value may be modified to vary the threshold value as a function of any parameter.

At 308, a computing device including a user interface may be invoked to perform an action, such as generating or refining a response, to facilitate the response to a classified message. Note that in some examples, a user interface need not be invoked to perform an action. An action need not be performed, for example, if an item is identified as having an attribute for which value is indeterminate, negligible, or otherwise is not valuable. In this case, an item need not be presented to a user. At 310, a user input may be presented on the user interface configured to accept a data signal to initiate the action. For example, a user input may specify whether to "respond" or "dismiss" a received electronic message.

Figure 4:
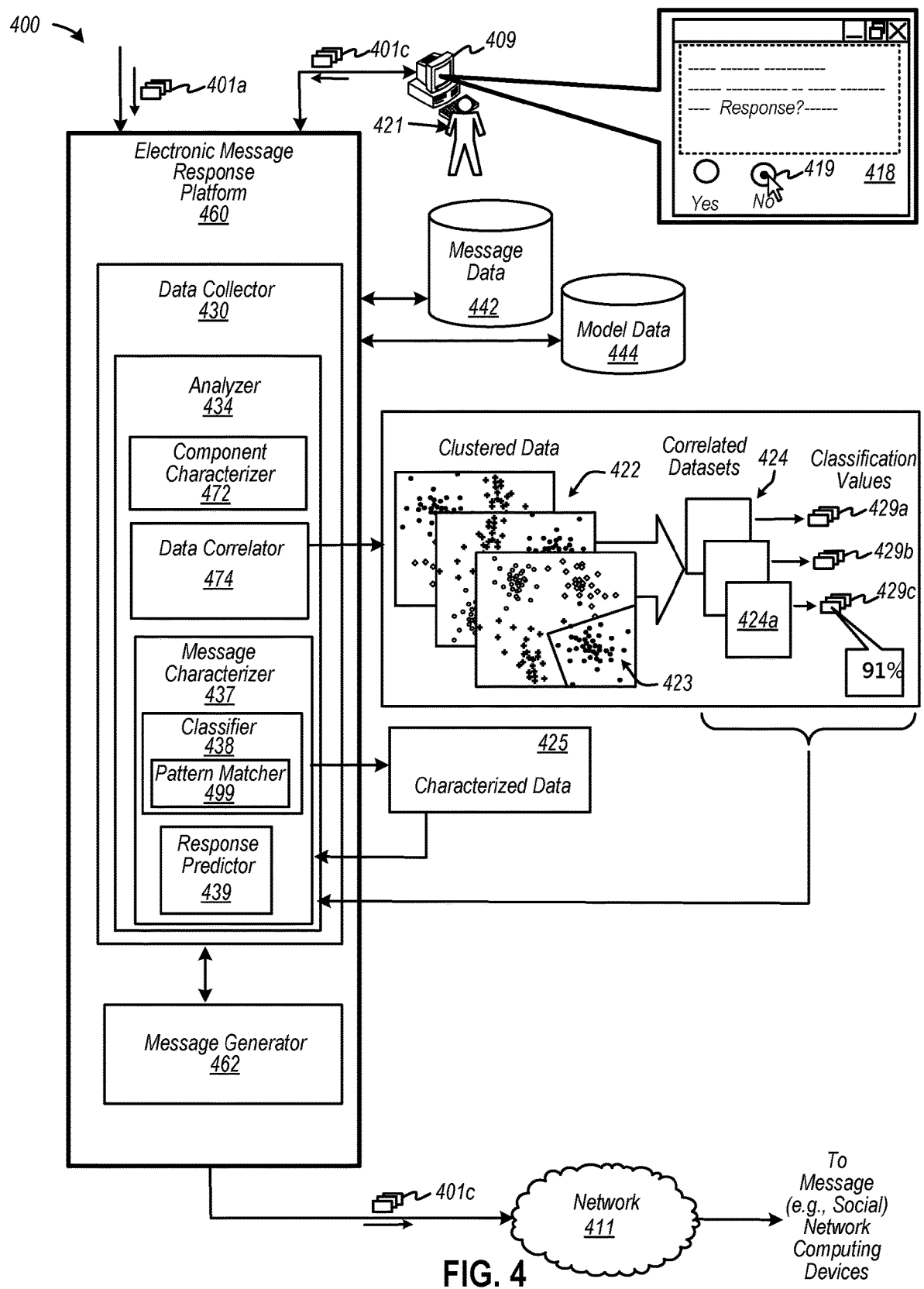
FIG. 4 is a diagram depicting an example of an electronic message response platform configured to collect and analyze electronic messages to model predictive responses, according to some examples.

FIG. 4 is a diagram depicting an example of an electronic message response platform configured to collect and analyze electronic messages to model predictive responses, according to some examples. Diagram 400 includes a response platform 460 configured to generate a data model based on analyses of historic electronic messages and corresponding dispositions thereof (e.g., whether a message type is predicted to cause or invoke a responsive action, including generating and transmitting a response electronic message 401c). Response platform 460 includes a data collector 430 and a message generator 462. Further, data collector 430 is shown to include an analyzer 434, which, in turn, includes a component characterizer 472, a data correlator 474, and a message characterizer 437, any of which may be implemented in hardware or software, or a combination of both. In one or more implementations, elements depicted in diagram 400 of FIG. 4 may include structures and/or functions as similarly-named or similarly-numbered elements depicted in other drawings. Further, structures and/or functions of elements depicted in diagram 400 of FIG. 4 are presented as merely one instructive example to form, use, and update a data model stored in repository 444. Thus, diagram 400 depicts but one of various other implementations to form, use, and update a data model for predicting generation of a response as a function of characterized message components, among other things.

Analyzer 434 may be configured to data mine and analyze relatively large number of datasets with hundreds, thousands, millions, or any innumerable amount of data points having multiple dimensions, variables, or attributes. Further, analyzer 434 may be configured to correlate one or more attributes or subsets of data, as datasets 423, to one or more classification values 429a to 429c so that generation of a response electronic message may be predicted based on a particular electronic message and a classification value.

Component characterizer 472 may be configured to receive data 401a representing electronic messages and any other source of data from which components (e.g., words, phrases, topics, etc.) of one or more subsets of electronic messages (e.g., published messages) may be extracted and characterized. In some examples, component characterizer 472 may be configured to identify attributes that may be characterized to determine values, qualities, or characteristics of an attribute. For instance, component characterizer 472 may determine attributes or characteristic that may include a word, a phrase, a topic, or any message attribute, and can describe the component and a corresponding value as metadata. Message attributes (or component characteristics) may be expressed in any value or data type, such as numeric, string, logical, etc. A message attribute may include metadata that describes, for example, a language associated with the word (e.g., a word is in Spanish), or any other descriptor, such as a number of messages received from a particular sender over an interval of time (e.g., indicative of urgency), a topic (e.g., "alcohol," "store hours," "product name X," "modify order," etc.) and the like. In some examples, component characterizer 472 may implement at least structural and/or functional portions of a message component attribute determinator 233 of FIG. 2.

Data correlator 474 may be configured to statistically analyze components and attributes of electronic messages to identify predictive relationships between, for example, an attribute and a value predicting a likelihood that a received electronic message may invoke a response message. According to some embodiments, data correlator 474 may be configured to classify and/or quantify various "attributes" and/or "received electronic messages" by, for example, applying machine learning or deep learning techniques, or the like. In one example, data correlator 474 may be configured to segregate, separate, or distinguish a number of data points (e.g., vector data) representing similar (or statistically similar) attributes or received electronic messages, thereby forming one or more sets of clustered data 422, each of which may include one or more clusters 423 of data (e.g., in 3-4 groupings of data). Clusters 423 of data may be grouped or clustered about a particular attribute of the data, such as a source of data (e.g., a channel of data), a type of language, a degree of similarity with synonyms or other words, etc., or any other attribute, characteristic, parameter or the like. In at least one example, each cluster 423 of data may define a subset of electronic messages having one or more similarities (e.g., a statistically same topic). For example, electronic messages associated with cluster 423 may relate to "payment related" message content, and may have one or more similar attributes having similar attribute values.

According to some examples, data correlator 474 may identify one of datasets 424 for at least one cluster 423, whereby dataset 424a may include a subset of attribute values. For example, dataset 424a may be associated with predominant values of "TW" (e.g., Twitter™) for a channel type attribute, "store hours" for a topic attribute, "5" as "a number of messages sent per a user" attribute, and "EN" as a language attribute. Note that diagram 500 depicts use of these attributes and values in FIG. 5. Referring back to FIG. 4, data correlator 474 may form dataset 424 as a correlated dataset 424a by computing and associating a classification value 429c to one of datasets 424. Data correlator 474, therefore, may be configured to analyze past actions, activities, and behaviors that are recorded or stored in message data repository 442 for dataset 424a (and/or cluster 423) to compute a likelihood that a next received electronic message may be similar to dataset 424a. may have common or similar likelihoods. If similar, both In this example, data correlator 474 may determine that over 10,000 previously-received electronic messages are associated with dataset 424a, and that 9,100 response messages have been generated responsive to the 10,000 previously-received electronic messages. Thus, at least in this example, a classification value ("91%") 429c (e.g., 10,000/9,100) may be linked to dataset 424a, thereby forming a correlated dataset 424a. Hence, a correlated dataset may be described as being linked to a value indicative of a predicted action. According to various examples, clustered data 422, correlated datasets 424, and classification values 429a to 429c, as well as threshold values, one or more of which may constitute a data model that is be stored in model data repository 444.

While any number of techniques may be implemented, data correlator 474 may apply "k-means clustering," or any other clustering data identification techniques to form clustered data 422 and cluster analysis thereof. In some examples, data correlator 474 maybe configured to detect patterns or classifications among datasets 424 and other data through the use of Bayesian networks, clustering analysis, as well as other known machine learning techniques or deep-learning techniques (e.g., including any known artificial intelligence techniques, or any of k-NN algorithms, linear support vector machine ("SVM") algorithm, regression and variants thereof (e.g., linear regression, non-linear regression, etc.), Bayesian inferences and the like, including classification algorithms, such as Naïve Bayes classifiers, or any other statistical or empirical technique).

Message characterizer 437 is shown to include a classifier 438, which in turn, may include a pattern matcher 499, and a response predictor 439. In some examples, message characterizer 437 may implement at least structural and/or functional portions of a message characterizer 237 of FIG. 2. Message characterizer 437 may be configured to characterize a "newly-received" message for comparison against a data model to form a set of characterized data 425. Thus, classifier 438 may be configured to identify attributes and corresponding attributes that may be matched, as a data pattern, against patterns of data including correlated datasets 424 and the like. Consider that pattern matcher 499 determines that characterized data 425 matches correlated dataset 424a, which may be associated with a classification value of 91%. Thus, characterized data 425 for a "newly-received" message may be linked to, or otherwise described as having, a likelihood of 91% with which a response message is predicted. Response predictor 439 may be configured, at least in some cases, to compare classification value 429c to a threshold value with which to test whether an action, such as generating a response message, is predicted to occur. For example, if a threshold value for generating a response is 85% and classification value 429c of 91%, is greater (which it is in this example), then response predictor 439 predicts (and causes) generation of a response message.

Message generator 462 may be configured to generate a response message 401c automatically or based on user input. A response electronic message may be formatted for transmission as data 401c via networks 411 to any number of social media network computing devices. Response message 401c and a user input signal generated at user input 419 are fed back, prior to sending, into electronic message response platform 460. In this case, while a received message has been predicted to generate a response with a 91% likelihood, user 421 selected "No" to a question whether to respond in user interface 418 of computing device 409. As the user-initiated action is contrary to a predicted action, analyzer 434 may be configured to adapt the data model based on the newly-received electronic message and its attributes and datasets 424. As such, a data model stored in repository 444 may be recalibrated to adapt to a recorded action of "dismiss" (by selecting user input 419). In various examples, analyzer 434 may be configured to continuously adapt a data model as, for example, different data patterns are recognized as a result of different content in received electronic messages.

Figure 5:
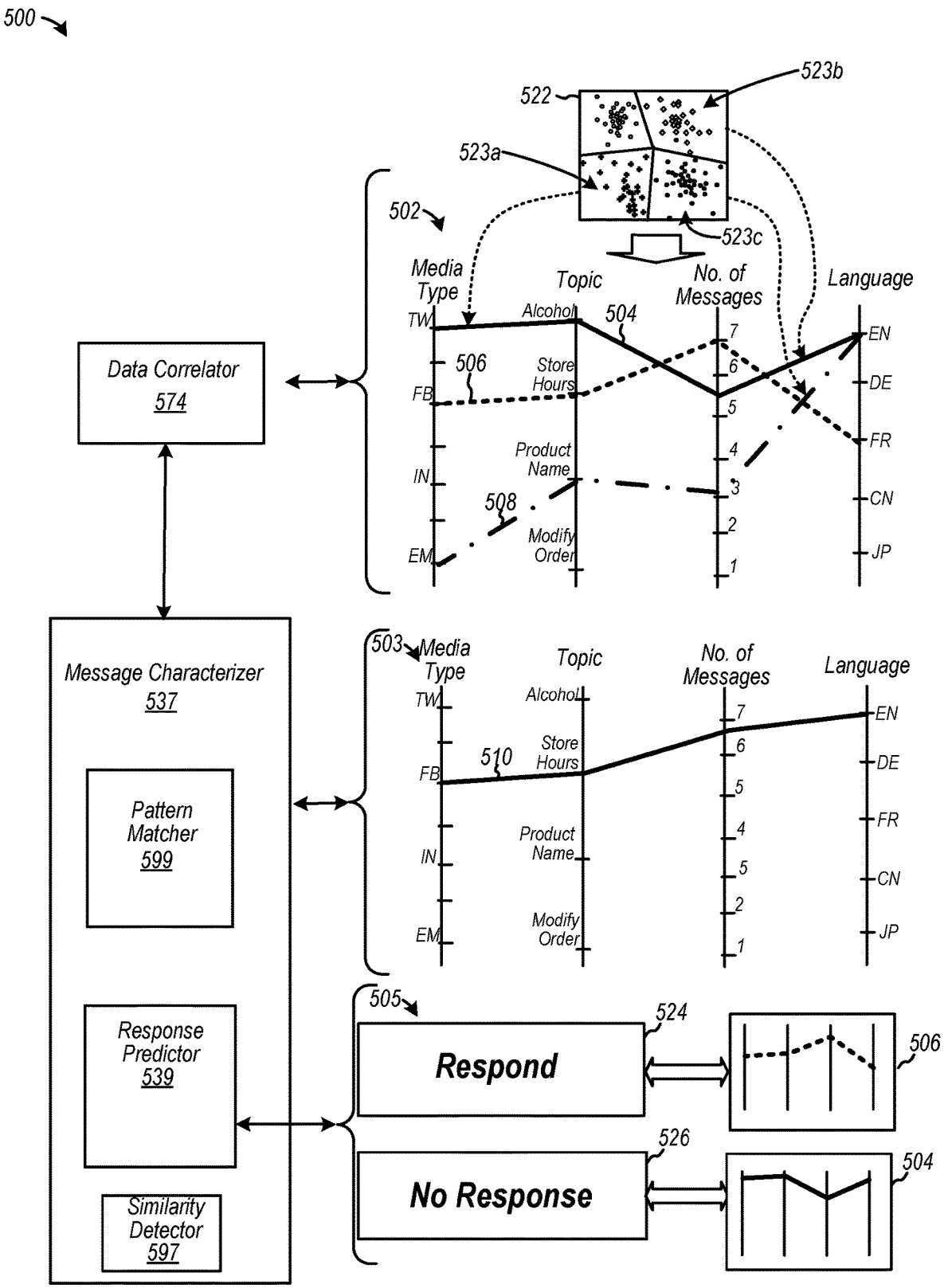
FIG. 5 is a diagram depicting an example of a data correlator and a message characterizer configured to determine a predictive response, according to some embodiments.

FIG. 5 is a diagram depicting an example of a data correlator and a message characterizer configured to determine a predictive response, according to some embodiments. Note that diagram 500 is illustrative of one example by which to determine whether generation of a response electronic message may be predicted, and, as such, diagram 500 is not intended to limit the prediction of responses to structural elements and/or functional features described in FIG. 5. According to the example shown, diagram 500 includes a data correlator 754 configured to identify datasets, and a message characterizer 537 that may be configured to characterize an incoming electronic message and predict whether a response may be generated. Message characterizer 537 is shown to include a pattern matcher 599, a response predictor 539, and a similarity detector 597. In one or more implementations, elements depicted in diagram 500 of FIG. 5 may include structures and/or functions as similarly-named or similarly-numbered elements depicted in other drawings.

Data correlator 574 may be configured to form or otherwise identify datasets with which to use in comparisons. To convey a quality of a dataset and associated attribute values, "a shape" for each of three datasets are shown mapped to a parallel coordinate plot 502. As shown, cluster ("1") 523a of clustered data 522 is mapped to a curve or plot 504, cluster ("2") 523b is mapped to plot 506, and cluster ("3") 523c is mapped to plot 508. In some cases, plots 502, 504, and 506 may represent median attribute values (regardless of whether the values are numeric, string, etc.). Therefore, plot 502 illustrates visually a result of data correlator 574 being configured to form and identify datasets based on characterized attribute data, whereby plot 502 may convey the degrees of similarities and differences among several datasets (and clusters).

Message characterizer 537 may be configured to characterize a "newly-received" message for comparison against a data model, which includes data set forth in plot 502, to form a set of characterized data. Also, message characterizer 537 may be configured to identify attributes that may be matched, as a data pattern (e.g., in plot 503), against patterns of data in plots 504, 506, and 508. In this example, a newly-received message may be characterized as having attributes and attribute values set forth a data pattern 510. According to some examples, pattern matcher 599 may be configured to match data pattern 510 against plots 504, 506, and 508 to determine which of plots 504 to 508 are similar to plot 510. For example, pattern matcher 599 may implement curve matching or fitting techniques, or other regression techniques to determine whether plot 510 best matches either plot 504 or 506.

Response predictor 539 may be configured to initiate a "response" action 524 or take no action (e.g., "no response") 526. Further to the example shown, consider that data pattern 506 is linked to or otherwise associated with a classification value indicative of predicting a response, whereas data pattern 504 may be linked to or otherwise associated with another classification value indicative of dismissing a message relative to a threshold value. So, if pattern matcher 599 determines that data pattern 510 may be most similar to data pattern 506, then a response 524 may be predicted.

Similarity detector 597 may be configured to determine a degree of similarity of a pattern of data to the dataset. In one implementation, a value representing a likelihood of a response (e.g., classification value) may be modified as a function of the degree of similarity. Alternatively, a threshold value may be modified based on a computed degree of similarity. So, for example, if an electronic message is associated with a likelihood of response of "0.80," but has a degree of similarity of "0.70" (e.g., 70% similar to a dataset), then the threshold value may change to a lesser value to increase a tolerance (e.g., to identify false negatives). Thus, at least in some cases, a higher degree of similarity may correlate to increased precision in predicting a response message is to be generated. Again, the above-described functionalities of data correlator 574 and message characterizer 537, in relation to depicted plots 502 and 503, are intended to be instructive of one of many ways of performing the various implementations described herein.

Figure 6:
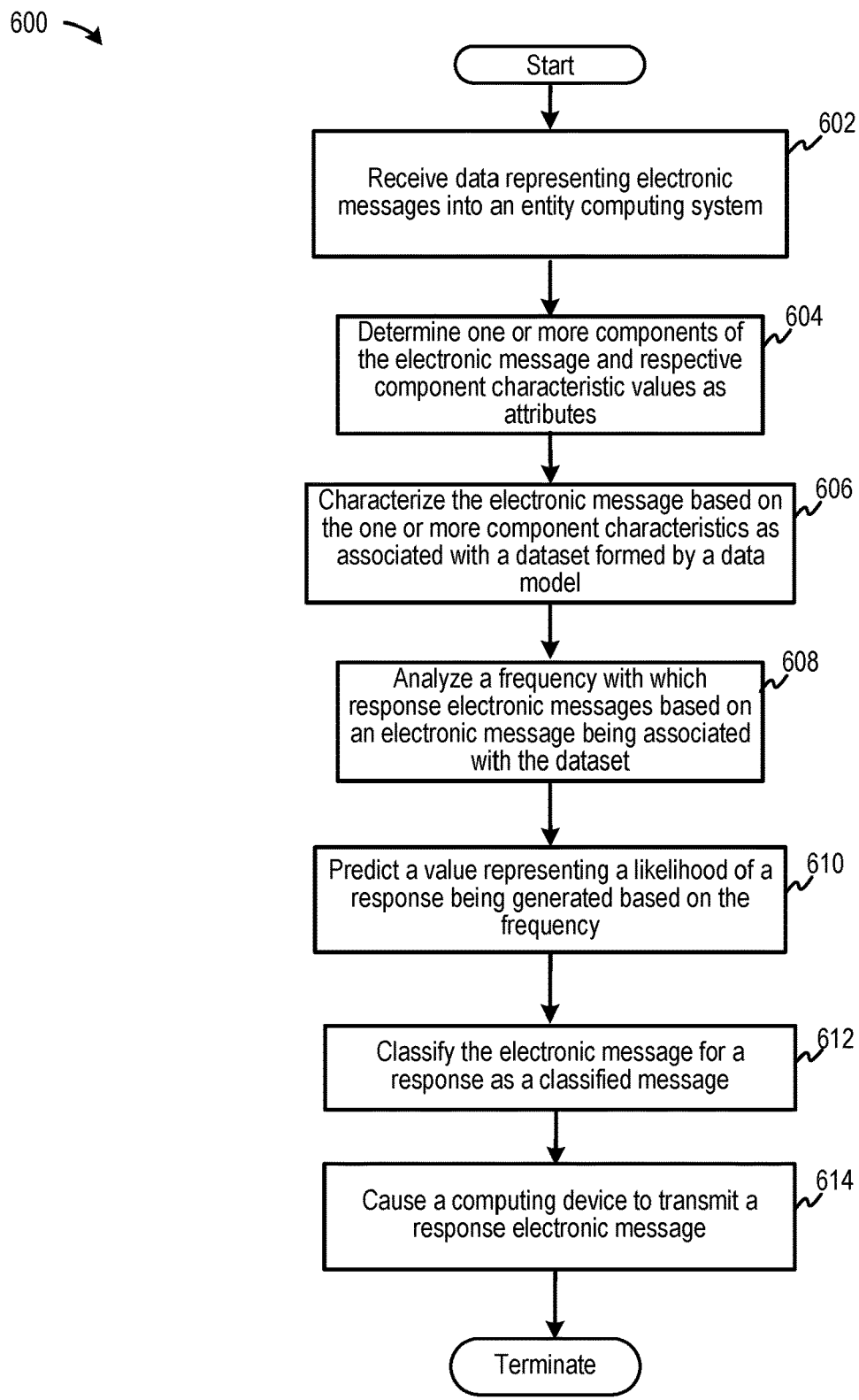
FIG. 6 is a flow diagram as an example of forming a set of patterned data to predict whether an electronic message generates a response, according to some embodiments.

FIG. 6 is a flow diagram as an example of forming a set of patterned data to predict whether an electronic message generates a response, according to some embodiments. Flow 600 may be an example of forming a model based on historic behavior and/or activity (e.g., based on which pattern of data is associated with or invokes a response). At 602, data representing a sample of electronic messages are received into an entity computing system to form, for example, a data model. At 604, one or more components of an electronic message and respective component characteristic values may be identified or determined as attributes. At 606, an electronic message may be characterized by, for example, characterizing one or more component characteristics to identify whether a characterized message is associated with a dataset formed by a data model (e.g., during a first time interval in which a model is formed). Further to 606, a data model may be formed so that patterns of data may be identified. The patterns of data can be compare against one or more component characteristics to, for example, determine a match between a pattern of data to a subset of component characteristics to determine the dataset. The subset of component characteristics may be associated with likelihood of generating a response. According to some examples, a degree of similarity of a pattern of data to the dataset may be determined. For example, curve matching or fitting techniques, as well as regression techniques and the like may be used to quantify similarity of one electronic message against a dataset. In one implementation, a value representing a likelihood of a response may be modified as a function of the degree of similarity. For example, a threshold value may be modified based on a computed degree of similarity. So if an electronic message is associated with a likelihood of response of "0.80," but has a degree of similarity of "0.70" (e.g., 70% similar to a dataset), then the threshold value may change to a lesser value to increase a tolerance (e.g., to identify false negatives).

At 608, a frequency with which response electronic messages based on an electronic message being associated with the dataset may be analyzed. For example, a subset of electronic messages in which each message matches (or substantially matches) a pattern of data (e.g., a dataset) may be associated with a rate of response, such as 80%. Thus, any future electronic message that matches that pattern of data may be predicted to generate a response, for example, 80% of the time. Hence, the rate of response may be used to predict a value representing a likelihood of a response being generated based on the frequency. According to some examples, transmission of a response electronic message may be detected to feed information back into the data model. Thus, a value representing a frequency may be modified responsive to include the response, whereby a data model may be recalibrated to modify a likelihood of a response for a subsequent electronic message (e.g., during a second interval of time in which a model is being used with feedback). At 610, an electronic message that generates a response may be classified to form a classified message. At 612, a computing device may be invoked to transmit a response electronic message based on the classification of the classified message. Note that in some examples, a computing device need not be invoked to transmit a response electronic message. Thus, a response electronic message not be transmitted, for example, if the value of transmitting the message is negligible or of no value. In this case, a response electronic message need not be transmitted.

Figure 7:
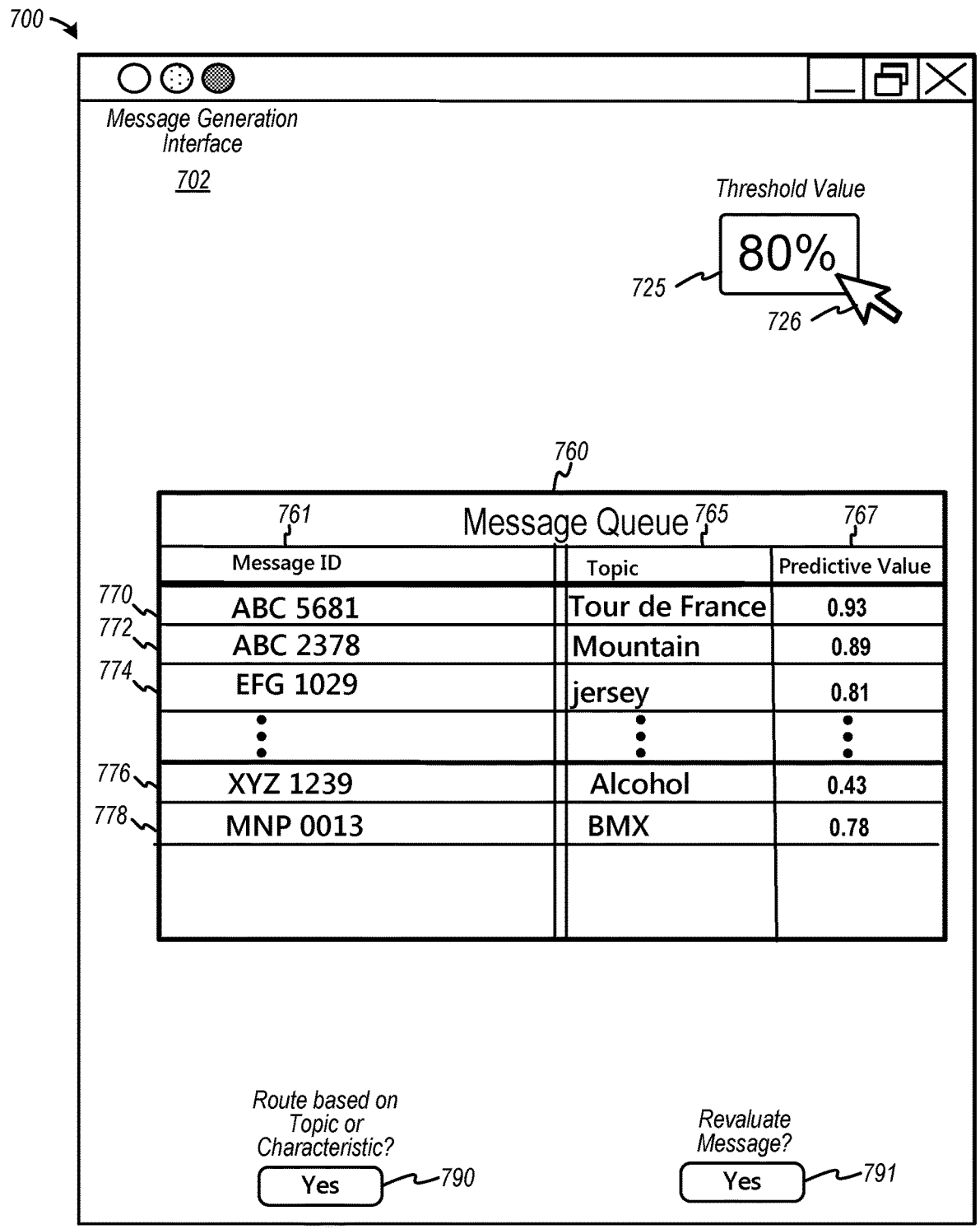
FIG. 7 is a diagram depicting an example of a user interface configured to accept data signals to visually identify and/or interact with a subset of messages predicted to generate a response, according to some examples.

FIG. 7 is a diagram depicting an example of a user interface configured to accept data signals to visually identify and/or interact with a subset of messages predicted to generate a response, according to some examples. Diagram 700 includes a user interface 702 configured to depict or present data representing a message queue 760 with which to formulate a response or refine the process of forming a response electronic message, according to some examples.

As shown, interface 702 depicts a graphical representation 720 of message queue 760, which presents summaries 770, 772, and 774 of each received message having a message identifier ("ID") 761, a topic 765 as an attribute value, and a predictive value 767 (i.e., a classification value). Interface 702 also includes a threshold value ("80") 725, which is selectably adjustable up or down via selecting device 726. Modifying threshold value 725 forms another threshold value that, for example, may enhance tolerance during matching of electronic messages against a data model. Also, modifying threshold value 725 may modify an amount of false negatives that may be detected and corrected (e.g., by way of audit). In some cases, selecting device 726 may activate input 790, which may be configured to perform refined processing, such as routing one of messages 770, 772, and 774 to another computing device based on an attribute, such as language, topic, etc. Selecting device 726 may also be used to activate input 791, which may be used to reevaluate predictive value 767 of a message, such as messages 776 and 778. In some cases, these messages may not be predicted to generate a response, and, thus, dismissed. However, activation of input 791 may override a predicted dismissal of such messages. Note that one or more of the functionalities described in diagram 700 may be performed automatically.

Figure 8:
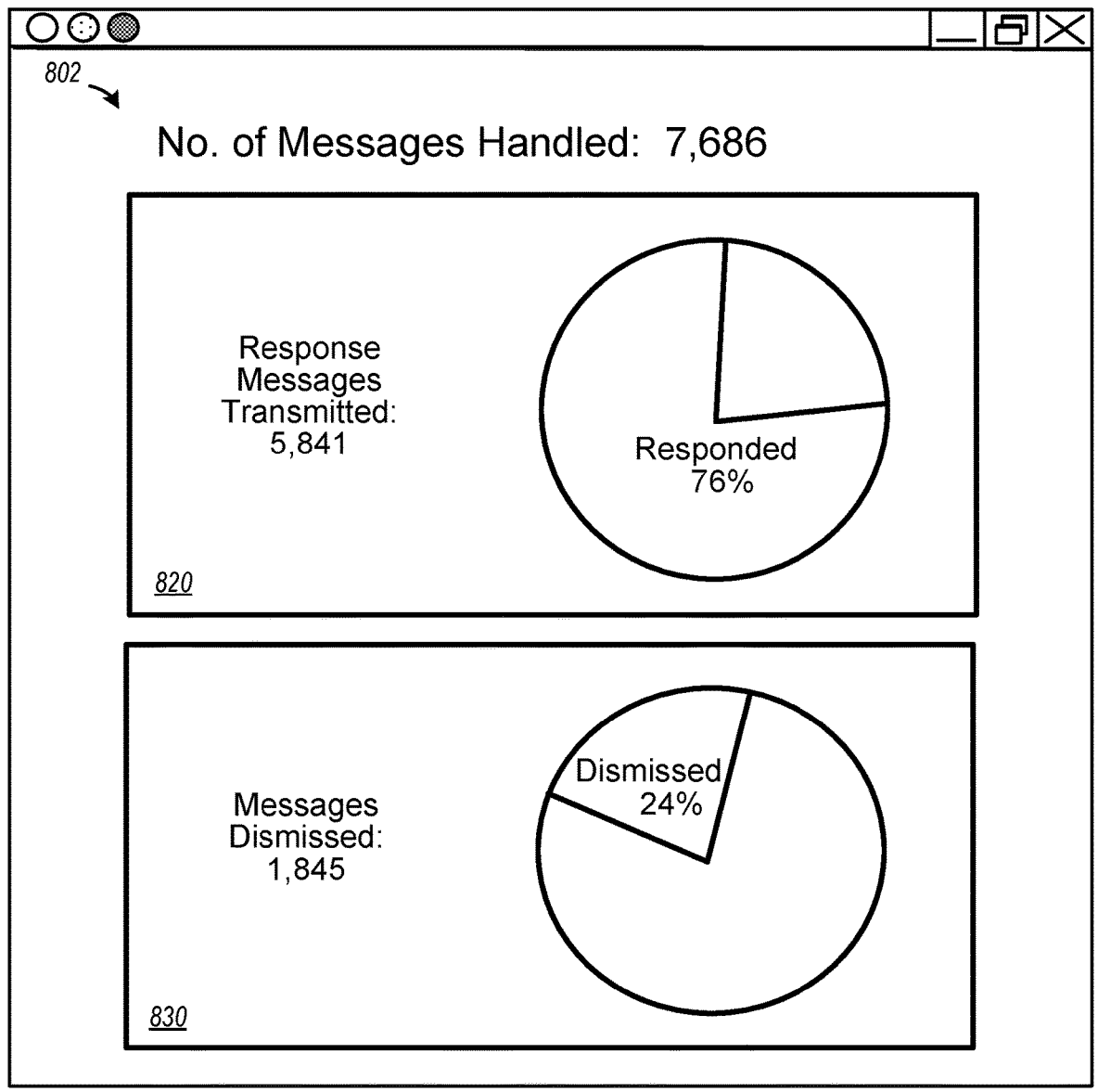
FIG. 8 is a diagram depicting an example of a user interface configured to aggregation of messages predicted to at least generate a response, according to some examples.

FIG. 8 is a diagram depicting an example of a user interface configured to aggregation of messages predicted to at least generate a response, according to some examples. Diagram 800 includes a user interface 802 configured to depict or present data representing a first graphical representation 820 to depict a number of response messages transmitted (e.g., based on likelihood of received messages predicted to invoke such responses), according to some examples. Note, too, that a second graphical representation 830 depicts a number of messages dismissed. In some cases, the dismissed messages need not be analyzed by computing device or reviewed by an agent-user, thereby conserving resources and enhancing responsiveness, among other things.

Figure 9:
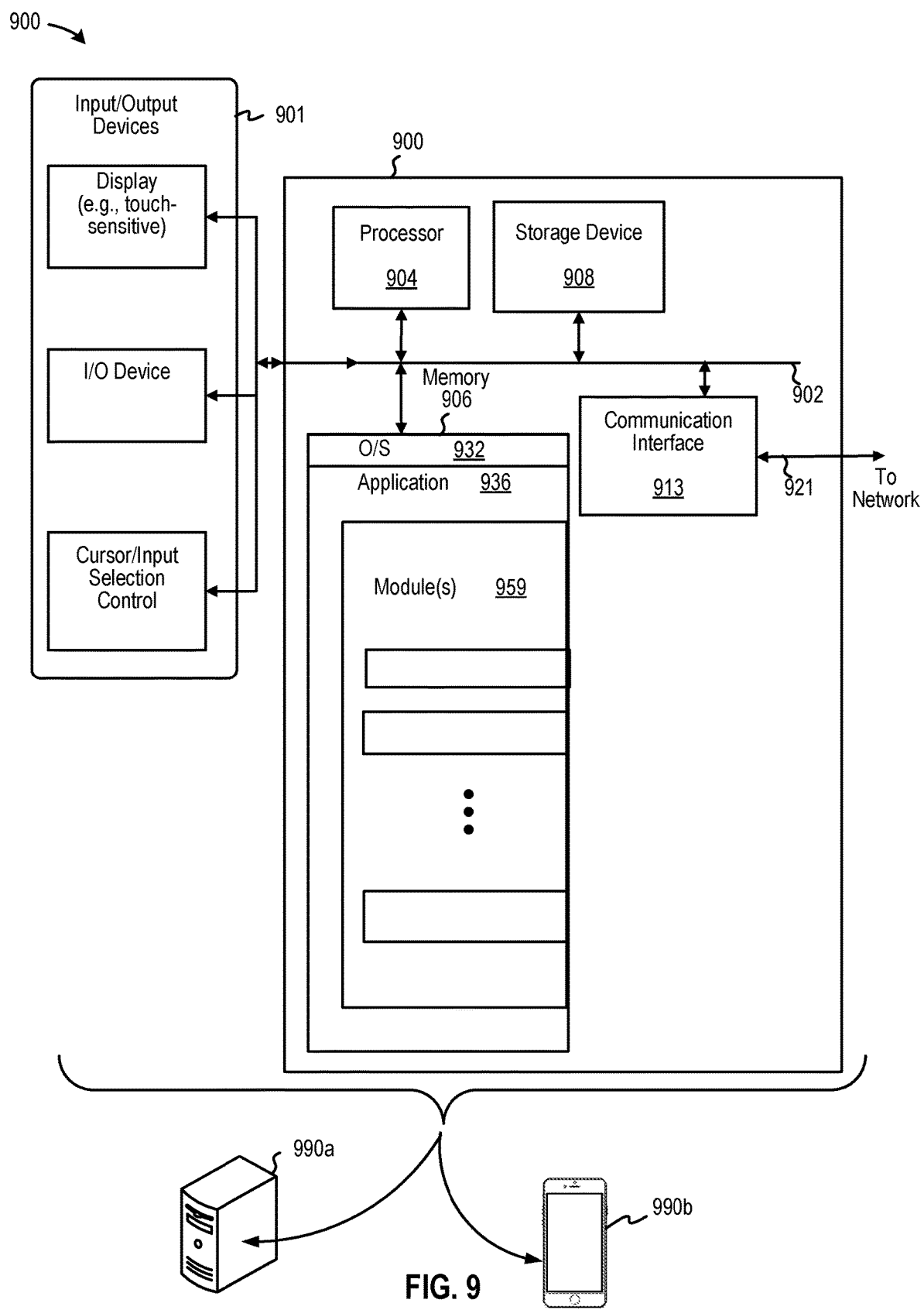
FIG. 9 is a diagram depicting an example of an electronic message response platform configured to harvest and analyze electronic messages, according to some examples.

FIG. 9 illustrates examples of various computing platforms configured to provide various functionalities to components of an electronic message response management platform 900, which may be used to implement computer programs, applications, methods, processes, algorithms, or other software, as well as any hardware implementation thereof, to perform the above-described techniques.

In some cases, computing platform 900 or any portion (e.g., any structural or functional portion) can be disposed in any device, such as a computing device 990a, mobile computing device 990b, and/or a processing circuit in association with initiating any of the functionalities described herein, via user interfaces and user interface elements, according to various examples.

Computing platform 900 includes a bus 902 or other communication mechanism for communicating information, which interconnects subsystems and devices, such as processor 904, system memory 906 (e.g., RAM, etc.), storage device 908 (e.g., ROM, etc.), an in-memory cache (which may be implemented in RAM 906 or other portions of computing platform 900), a communication interface 913 (e.g., an Ethernet or wireless controller, a Bluetooth controller, NFC logic, etc.) to facilitate communications via a port on communication link 921 to communicate, for example, with a computing device, including mobile computing and/or communication devices with processors, including database devices (e.g., storage devices configured to store atomized datasets, including, but not limited to triplestores, etc.). Processor 904 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 900 exchanges data representing inputs and outputs via input-and-output devices 901, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 901 may be implemented as, or otherwise substituted with, a user interface in a computing device associated with, for example, a user account identifier in accordance with the various examples described herein.

According to some examples, computing platform 900 performs specific operations by processor 904 executing one or more sequences of one or more instructions stored in system memory 906, and computing platform 900 can be implemented in a client-server arrangement, peer-to-peer arrangement, or as any mobile computing device, including smart phones and the like. Such instructions or data may be read into system memory 906 from another computer readable medium, such as storage device 908. In some examples, hard-wired circuitry may be used in place of or in combination with software instructions for implementation. Instructions may be embedded in software or firmware. The term "computer readable medium" refers to any tangible medium that participates in providing instructions to processor 904 for execution. Such a medium may take many forms, including but not limited to, non-volatile media and volatile media. Non-volatile media includes, for example, optical or magnetic disks and the like. Volatile media includes dynamic memory, such as system memory 906.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 902 for transmitting a computer data signal.

In some examples, execution of the sequences of instructions may be performed by computing platform 900. According to some examples, computing platform 900 can be coupled by communication link 921 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 900 may transmit and receive messages, data, and instructions, including program code (e.g., application code) through communication link 921 and communication interface 913. Received program code may be executed by processor 904 as it is received, and/or stored in memory 906 or other non-volatile storage for later execution.

In the example shown, system memory 906 can include various modules that include executable instructions to implement functionalities described herein. System memory 906 may include an operating system ("O/S") 932, as well as an application 936 and/or logic module(s) 959. In the example shown in FIG. 9, system memory 906 may include any number of modules 959, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 959 of FIG. 9, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 959 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 959 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit. For example, modules 959 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
receiving data representing an electronic message including with data representing an item associated with an entity computing system associated with an electronic messaging account;
identifying one or more component characteristics associated with one or more components of the electronic message, wherein the one or more component characteristics are each represented by a component characteristic value comprising data representing one or more of a language, a word, and a topic specifying a product or a service, a quality issue, or a payment issue;
characterizing the electronic message based on the one or more component characteristics to classify the electronic message for a response as a classified message, wherein:
characterizing the electronic message determines at least one classification value that specifies generation of a responsive electronic message;
retrieving a first threshold value from data storage against which to compare with a first value to classify the electronic message, wherein the first value represents a probability derived from the one or more component characteristics;
comparing the first threshold value to the first value; and
classifying the first value as a first classification value, wherein the first classification value represents a likelihood of an action;
matching a subset of patterns of data from the electronic message against a data model being associated with a likelihood that a specific pattern of data causes a response implemented in the responsive electronic message wherein the data model includes at least patterns of data corresponding to the one or more component characteristics;
causing a computing device including a user interface to perform an action to facilitate the response to the classified message; and
presenting a user input on the user interface configured to accept a data signal to initiate the action.

2. The method of claim 1 further comprising:
identifying a second threshold value against which to compare with a first value 20 to classify the electronic message;
modifying the second threshold value to vary from a first threshold value; and classifying the first value as a second classification value.

3. The method of claim 2 further comprising:
causing evaluation of the electronic message with the second classification value; identifying the second classification value as a false negative; and
reclassifying the electronic message to associate with the first classification value to form a reclassified electronic message.

4. The method of claim 3 further comprising:
recalibrating a data model configured to characterize the electronic message based 10 the reclassified electronic message to increase predictions of the first classification value.

5. The method of claim 1 further comprising:
identifying a third threshold value against which to compare with a first value to classify the electronic message;
comparing the third threshold value to the first value; and classifying the first value as a third classification value.

6. The method of claim 5 further comprising: detecting the third classification value; and
dismissing the electronic message.

7. The method of claim 1 wherein identifying the one or more component characteristics comprises:
identifying a component characteristic having a component characteristic value; and
performing the action as a function of the component characteristic value.

8. The method of claim 7 wherein performing the action comprises:
routing the electronic message to an agent computing system to generate a response.

9. The method of claim 1 wherein characterizing the electronic message to classify the electronic message comprises:
classifying the electronic message as having a first classification in which a response to the electronic message is generated; and
generating a responsive electronic message.

10. The method of claim 1 wherein the action is a generated electronic message responsive to at least one of the components of the electronic message.

11. The method of claim 1 wherein the electronic message includes data representing transmission to the electronic messaging account.

12. The method of claim 1 wherein the electronic message includes data representing transmission to a third party computing system having a third party electronic messaging account.

13. A method comprising:
receiving data representing electronic messages into an entity computing system associated with an electronic messaging account;
determining one or more components of the electronic message and respective component characteristic values as attributes wherein the one or more component characteristics are each represented by a component characteristic value comprising data representing one or more of a language, a word, and a topic specifying a product or a service, a quality issue, or a payment issue;
characterizing the electronic message based on the one or more component characteristics during a first time interval as associated with a dataset formed by a data model, wherein characterizing the electronic message a determines at least one classification value that specifies generation of a responsive electronic message;
matching a subset of patterns of data from the electronic message against the dataset being associated with a likelihood that a specific pattern of data causes a response implemented in the responsive electronic message;
analyzing a frequency with which response electronic messages based on an electronic message being associated with the dataset;
predicting a value representing a likelihood of a response being generated based on the frequency, and the one or more component characteristics, wherein the predicting further comprises:
retrieving a first threshold value from data storage against which to compare with a first value to classify the electronic message, wherein the first value represents a probability derived from the one or more component characteristics;
comparing the first threshold value to the first value; and
classifying the first value as the predicted value;
classify the electronic message for a response as a classified message; and
causing a computing device to transmit a response electronic message.

14. The method of claim 13 wherein characterizing the electronic message comprises: forming the data model;
identifying patterns of data against which to compare the one or more component characteristics; and
matching a pattern of data to a subset of component characteristics to determine the dataset.

15. The method of claim 14 further comprising:
determining a degree of similarity of the pattern of data to the dataset; and
adjusting the value representing a likelihood of a response as a function of the degree of similarity.

16. The method of claim 13 further comprising:
detecting the response electronic message is transmitted;
modifying a value representing the frequency responsive to include the response; and
updating the data model to recalibrate the likelihood of a response for a subsequent electronic message during a second interval of time.

* * * * *